(12) United States Patent
Tercha et al.

(10) Patent No.: US 9,108,470 B2
(45) Date of Patent: Aug. 18, 2015

(54) RUN-FLAT DEVICE

(75) Inventors: Mike Tercha, Weston, WI (US); Karen Hauch, Wausau, WI (US); Glenn Howland, Kronenwetter, WI (US); Todd Petersen, Ringle, WI (US); Fidelis Ceranski, Marathon, WI (US); Louie Stark, Mosinee, WI (US); Brian Meliska, Weston, WI (US)

(73) Assignee: Polaris Industries Inc., Medina, MN (US)

( * ) Notice: Subject to any disclaimer, the term of this patent is extended or adjusted under 35 U.S.C. 154(b) by 534 days.

(21) Appl. No.: 12/948,657

(22) Filed: Nov. 17, 2010

(65) Prior Publication Data

US 2011/0146872 A1   Jun. 23, 2011

Related U.S. Application Data

(63) Continuation-in-part of application No. 12/240,918, filed on Sep. 29, 2008, now abandoned, and a continuation-in-part of application No. PCT/US2009/058652, filed on Sep. 28, 2009.

(51) Int. Cl.
| | |
|---|---|
| *B60C 17/00* | (2006.01) |
| *B60C 17/04* | (2006.01) |
| *B60C 7/08* | (2006.01) |
| *B60C 7/12* | (2006.01) |
| *B60C 17/06* | (2006.01) |

(52) U.S. Cl.
CPC . *B60C 17/04* (2013.01); *B60C 7/08* (2013.01); *B60C 7/12* (2013.01); *B60C 17/041* (2013.04); *B60C 17/043* (2013.01); *B60C 17/06* (2013.01); *B60C 17/061* (2013.04)

(58) Field of Classification Search
CPC .... B60C 17/00; B60C 17/04; B60C 2017/00; B60C 2017/04
See application file for complete search history.

(56) References Cited

U.S. PATENT DOCUMENTS

| | | | |
|---|---|---|---|
| 576,072 A | 1/1897 | Humbrecht | |
| 617,054 A | 1/1899 | Schlick | |
| 637,200 A | 11/1899 | Finin | |
| 654,897 A | 7/1900 | Keller | |
| 690,872 A | 1/1902 | Peck | |
| 748,797 A | 1/1904 | Schwieger | |
| 793,003 A | 6/1905 | Mathey | |
| 798,185 A | 8/1905 | Irwin | |
| 811,232 A | 1/1906 | Lang et al. | |

(Continued)

FOREIGN PATENT DOCUMENTS

| | | |
|---|---|---|
| BE | 367854 A | 2/1930 |
| CN | 86106585 A | 7/1987 |

(Continued)

OTHER PUBLICATIONS

Machine translation of JP 2008-068857, 2008.*

(Continued)

*Primary Examiner* — Justin Fischer
(74) *Attorney, Agent, or Firm* — Faegre Baker Daniels LLP

(57) ABSTRACT

A run-flat device, which is inserted into pneumatic tires to allow mobility in the event of pressure loss in the pneumatic tire, can comprise an inner ring, outer ring, and an interconnected web connecting the two. The run-flat device can support an applied load by working in tension and compression.

9 Claims, 24 Drawing Sheets

(56) References Cited

U.S. PATENT DOCUMENTS

| | | |
|---|---|---|
| 818,568 A | 4/1906 | Sims |
| 820,077 A | 5/1906 | Whiteley |
| 822,021 A | 5/1906 | Sanderson |
| 856,957 A | 6/1907 | Hubbard |
| 906,804 A | 12/1908 | Kempshall |
| 927,154 A | 7/1909 | Martin |
| 946,617 A | 1/1910 | Saylor |
| 987,340 A | 3/1911 | Besler |
| 1,041,829 A | 10/1912 | Mallory |
| 1,042,035 A | 10/1912 | Ray |
| 1,057,734 A | 4/1913 | Harrison |
| 1,060,480 A | 4/1913 | Minnick |
| 1,066,267 A | 7/1913 | Gerleit |
| 1,085,700 A | 2/1914 | Percy |
| 1,101,702 A | 6/1914 | Lakoff |
| 1,106,238 A | 8/1914 | Papadopoulos |
| 1,136,546 A | 4/1915 | Markson |
| 1,146,654 A | 7/1915 | Rietschel |
| 1,147,600 A | 7/1915 | Borland |
| 1,154,504 A | 9/1915 | Gano |
| 1,156,311 A | 10/1915 | Rabey |
| 1,190,874 A | 7/1916 | Durfee |
| 1,227,791 A | 5/1917 | Huebner |
| 1,232,127 A | 7/1917 | Uhrinecz et al. |
| 1,242,269 A | 10/1917 | Teeple |
| 1,244,276 A | 10/1917 | Anglemyer |
| 1,252,736 A | 1/1918 | Szakacs |
| 1,262,501 A | 4/1918 | Huetter |
| 1,262,550 A | 4/1918 | Northern |
| 1,268,078 A | 5/1918 | Lambert |
| 1,282,690 A | 10/1918 | Hamlin |
| 1,286,634 A | 12/1918 | Holland |
| 1,287,255 A | 12/1918 | De Carmona |
| 1,292,729 A | 1/1919 | Drach |
| 1,300,933 A | 4/1919 | Divers |
| 1,349,914 A | 8/1920 | Pratt |
| 1,365,181 A | 1/1921 | Marzak et al. |
| 1,414,543 A | 5/1922 | Bessler |
| 1,414,544 A | 5/1922 | Bessler |
| 1,451,517 A | 4/1923 | Smith |
| 1,461,928 A | 7/1923 | Miller |
| 1,493,922 A | 5/1924 | Deister |
| 1,502,908 A | 7/1924 | Cozatt |
| 1,557,437 A | 10/1925 | Dodge |
| 1,640,613 A | 8/1927 | Miller |
| 1,660,845 A | 2/1928 | Mamessier |
| 1,710,524 A | 4/1929 | Vitenko |
| 1,753,735 A | 4/1930 | Athey |
| 1,788,042 A | 1/1931 | Bardaxoglou |
| 1,887,019 A | 11/1932 | Hart |
| 1,948,412 A | 2/1934 | Bennett |
| 2,055,461 A | 9/1936 | Baddock |
| 2,235,378 A | 3/1941 | Martin |
| 2,283,274 A | 5/1942 | Martin |
| 2,298,142 A | 10/1942 | Martin |
| 2,298,172 A | 10/1942 | Rose et al. |
| 2,331,212 A | 10/1943 | Martin |
| 2,341,721 A | 2/1944 | Kapp |
| 2,492,433 A | 12/1949 | Martin |
| 2,620,844 A | 12/1952 | Lord |
| 2,701,431 A | 2/1955 | Whitesell |
| 2,705,539 A | 4/1955 | Martin |
| 2,742,941 A | 4/1956 | Johnson |
| 2,912,032 A | 11/1959 | Alexander |
| 3,022,810 A | 2/1962 | Lambe |
| 3,182,705 A | 5/1965 | Markow |
| 3,188,775 A | 6/1965 | Cosmos |
| 3,219,090 A | 11/1965 | Cislo |
| 3,237,667 A | 3/1966 | Lindley |
| 3,311,149 A | 3/1967 | Mathiesen |
| 3,380,779 A | 4/1968 | Albright |
| 3,381,735 A | 5/1968 | Talcott et al. |
| 3,465,804 A | 9/1969 | Dupre |
| 3,493,027 A | 2/1970 | Dewhirst et al. |
| 3,635,273 A | 1/1972 | Patecell |
| 3,759,306 A | 9/1973 | Greiner et al. |
| 3,854,516 A | 12/1974 | Burnell |
| 3,907,018 A | 9/1975 | Fujikawa et al. |
| 3,957,101 A | 5/1976 | Ippen et al. |
| 4,014,418 A | 3/1977 | Ikeda et al. |
| 4,054,476 A | 10/1977 | Hara et al. |
| 4,058,152 A | 11/1977 | Beck et al. |
| 4,071,070 A | 1/1978 | Schmidt |
| 4,108,228 A | 8/1978 | Tiemann |
| 4,111,249 A | 9/1978 | Markow |
| 4,153,095 A | 5/1979 | Sarkissian |
| 4,169,494 A | 10/1979 | Kubica et al. |
| 4,226,273 A | 10/1980 | Long et al. |
| 4,235,270 A | 11/1980 | Kahaner et al. |
| 4,244,413 A | 1/1981 | Takahashi et al. |
| 4,262,726 A | 4/1981 | Welter |
| 4,287,927 A | 9/1981 | Caravito et al. |
| 4,294,730 A | 10/1981 | Kenney |
| 4,350,196 A | 9/1982 | Hampshire |
| 4,366,015 A | 12/1982 | Murray |
| 4,425,953 A | 1/1984 | Rohde et al. |
| 4,447,093 A | 5/1984 | Cunard et al. |
| 4,459,167 A | 7/1984 | Markow et al. |
| 4,549,592 A | 10/1985 | Schroder |
| 4,553,577 A | 11/1985 | Gregg |
| 4,558,727 A | 12/1985 | Golata et al. |
| 4,673,014 A | 6/1987 | Markow |
| 4,705,087 A | 11/1987 | Markow |
| 4,749,345 A | 6/1988 | Warmuth et al. |
| 4,769,416 A | 9/1988 | Gelling et al. |
| 4,784,201 A | 11/1988 | Palinkas et al. |
| 4,832,098 A | 5/1989 | Palinkas et al. |
| 4,894,281 A | 1/1990 | Yagi et al. |
| 4,917,162 A | 4/1990 | De Longcamp |
| 4,921,029 A | 5/1990 | Palinkas et al. |
| 4,934,425 A | 6/1990 | Gajewski et al. |
| 4,945,962 A | 8/1990 | Pajtas |
| 5,023,040 A | 6/1991 | Gajewski et al. |
| 5,042,544 A | 8/1991 | Dehasse |
| 5,050,656 A | 9/1991 | Ho |
| 5,073,444 A | 12/1991 | Shanelec |
| 5,086,815 A | 2/1992 | Panaroni et al. |
| 5,139,066 A | 8/1992 | Jarman |
| 5,168,910 A | 12/1992 | Zhang et al. |
| 5,174,634 A | 12/1992 | Blanck et al. |
| 5,223,599 A | 6/1993 | Gajewski |
| 5,236,027 A | 8/1993 | Lu |
| 5,265,659 A | 11/1993 | Pajtas et al. |
| 5,343,916 A | 9/1994 | Duddey et al. |
| 5,353,853 A | 10/1994 | Hansson |
| 5,460,213 A | 10/1995 | Pajtas |
| 5,494,090 A | 2/1996 | Kejha |
| 5,535,800 A | 7/1996 | Abbott |
| 5,690,872 A | 11/1997 | Krieg et al. |
| 5,743,316 A | 4/1998 | Chrobak |
| 5,823,634 A | 10/1998 | Pozzobon |
| 5,961,760 A | 10/1999 | Tajima et al. |
| 6,170,544 B1 | 1/2001 | Hottebart |
| 6,187,245 B1 | 2/2001 | Hedley |
| 6,257,604 B1 | 7/2001 | Laurent et al. |
| 6,279,630 B1 | 8/2001 | Herbert IMS |
| 6,286,572 B1 | 9/2001 | Chen |
| 6,298,891 B1 | 10/2001 | Harris |
| 6,364,424 B1 | 4/2002 | Lashlee et al. |
| 6,374,887 B1 | 4/2002 | Subotics |
| 6,394,407 B1 | 5/2002 | Ryaboy |
| 6,431,235 B1 | 8/2002 | Steinke |
| 6,447,702 B1 | 9/2002 | Ichihara |
| 6,450,222 B1 | 9/2002 | Fleming |
| 6,467,519 B1 | 10/2002 | Owen |
| 6,564,842 B2 | 5/2003 | Drieux et al. |
| 6,568,443 B2 | 5/2003 | Shoner |
| 6,615,885 B1 | 9/2003 | Ohm |
| 6,640,859 B1 | 11/2003 | Laurent et al. |
| 6,648,039 B1 | 11/2003 | Bina |
| 6,679,012 B1 | 1/2004 | Chen et al. |
| 6,681,822 B2 | 1/2004 | Adams et al. |
| 6,698,480 B1 | 3/2004 | Cornellier |
| 6,736,176 B2 | 5/2004 | Teratani |

(56) References Cited

U.S. PATENT DOCUMENTS

| | | |
|---|---|---|
| 6,769,465 B2 | 8/2004 | Rhyne et al. |
| 6,776,426 B2 | 8/2004 | Deal |
| 6,789,810 B2 | 9/2004 | Strong |
| 6,896,020 B1 | 5/2005 | Summers |
| 6,983,776 B2 | 1/2006 | Thompson et al. |
| 6,991,061 B2 | 1/2006 | Laurent |
| 6,994,134 B2 | 2/2006 | Grah |
| 6,994,135 B2 | 2/2006 | Delfino et al. |
| 7,013,939 B2 | 3/2006 | Rhyne et al. |
| 7,032,634 B2 | 4/2006 | Laurent et al. |
| 7,143,797 B2 | 12/2006 | Vannan |
| 7,152,641 B2 | 12/2006 | Ooyama |
| 7,174,936 B2 | 2/2007 | Becker et al. |
| 7,201,194 B2 | 4/2007 | Rhyne et al. |
| 7,231,948 B2 | 6/2007 | Forney, III et al. |
| 7,334,617 B2 | 2/2008 | Hill, III et al. |
| 7,418,988 B2 | 9/2008 | Cron et al. |
| 7,429,801 B2 | 9/2008 | Adamson et al. |
| 7,523,773 B2 | 4/2009 | Gabrys et al. |
| 7,546,862 B2 | 6/2009 | Moon et al. |
| 7,553,123 B2 | 6/2009 | Casaro |
| 7,650,919 B2 | 1/2010 | Rhyne et al. |
| 7,678,216 B2 | 3/2010 | Sandstrom et al. |
| 7,743,806 B2 | 6/2010 | Abe |
| D630,566 S | 1/2011 | Ebel et al. |
| 7,950,428 B2 | 5/2011 | Hanada et al. |
| 7,980,282 B2 | 7/2011 | Moyna et al. |
| 8,104,524 B2 | 1/2012 | Manesh et al. |
| 8,109,308 B2 | 2/2012 | Manesh et al. |
| 8,176,957 B2 | 5/2012 | Manesh et al. |
| 8,434,533 B2 | 5/2013 | Albert et al. |
| 2002/0096237 A1 | 7/2002 | Burhoe et al. |
| 2003/0229326 A1 | 12/2003 | Hovis et al. |
| 2004/0012246 A1 | 1/2004 | Rhyne et al. |
| 2004/0069385 A1 | 4/2004 | Timoney et al. |
| 2004/0203304 A1 | 10/2004 | Almonacil et al. |
| 2005/0014437 A1 | 1/2005 | Yoshida |
| 2005/0076983 A1 | 4/2005 | Kimura et al. |
| 2006/0021257 A1 | 2/2006 | Hung |
| 2006/0113016 A1 | 6/2006 | Cron et al. |
| 2006/0174989 A1 | 8/2006 | Jones |
| 2007/0200265 A1 | 8/2007 | Forney et al. |
| 2007/0215259 A1 | 9/2007 | Burns |
| 2007/0267116 A1 | 11/2007 | Rhyne et al. |
| 2008/0045643 A1 | 2/2008 | Henning et al. |
| 2008/0053586 A1 | 3/2008 | Hanada et al. |
| 2008/0073014 A1 | 3/2008 | Abe |
| 2008/0149247 A1* | 6/2008 | Heuze et al. ................ 152/520 |
| 2008/0169638 A1 | 7/2008 | Beyer-Meklenburg et al. |
| 2008/0220675 A1 | 9/2008 | Ikeno et al. |
| 2008/0314486 A1 | 12/2008 | Manesh et al. |
| 2009/0107596 A1 | 4/2009 | Palinkas et al. |
| 2009/0173421 A1 | 7/2009 | Love et al. |
| 2009/0211674 A1 | 8/2009 | Hanada et al. |
| 2009/0211675 A1 | 8/2009 | Louden |
| 2009/0211678 A1 | 8/2009 | Palinkas et al. |
| 2009/0211681 A1 | 8/2009 | Palinkas et al. |
| 2009/0250149 A1 | 10/2009 | Sebe |
| 2009/0283185 A1 | 11/2009 | Manesh et al. |
| 2009/0294000 A1 | 12/2009 | Cron |
| 2009/0301625 A1 | 12/2009 | Moon et al. |
| 2010/0018621 A1 | 1/2010 | Thompsom |
| 2010/0071824 A1 | 3/2010 | Gardetto |
| 2010/0078111 A1 | 4/2010 | Anderson et al. |
| 2010/0132858 A1 | 6/2010 | Arakawa et al. |
| 2010/0132865 A1 | 6/2010 | Iwase et al. |
| 2010/0193097 A1 | 8/2010 | Mcnier et al. |
| 2010/0200131 A1 | 8/2010 | Iwase et al. |
| 2010/0218869 A1 | 9/2010 | Abe |
| 2010/0260967 A1 | 10/2010 | Delfino et al. |
| 2010/0307653 A1 | 12/2010 | Delfino et al. |
| 2011/0011506 A1 | 1/2011 | Manesh et al. |
| 2011/0024008 A1 | 2/2011 | Manesh et al. |
| 2011/0030866 A1 | 2/2011 | Fadel et al. |
| 2011/0079335 A1 | 4/2011 | Manesh et al. |
| 2011/0180194 A1 | 7/2011 | Anderson et al. |
| 2011/0240193 A1 | 10/2011 | Matsuda et al. |
| 2011/0248554 A1 | 10/2011 | Chon et al. |
| 2012/0234444 A1 | 9/2012 | Palinkas et al. |
| 2012/0241062 A1 | 9/2012 | Manesh et al. |
| 2012/0247635 A1 | 10/2012 | Manesh et al. |
| 2012/0318421 A1 | 12/2012 | Matsuda et al. |

FOREIGN PATENT DOCUMENTS

| | | |
|---|---|---|
| CN | 1072380 A | 5/1993 |
| CN | 1400115 A | 3/2003 |
| CN | 1154582 C | 6/2004 |
| CN | 2933918 Y | 8/2007 |
| CN | 102069682 A | 5/2011 |
| DE | 79 283 C | 2/1894 |
| DE | 2456420 A1 | 8/1976 |
| DE | 2610381 A1 | 10/1976 |
| DE | 2718374 A1 | 11/1977 |
| DE | 2825451 A1 | 12/1978 |
| DE | 4428516 A1 | 2/1996 |
| DE | 102006037666 | 2/2008 |
| EP | 0071900 A2 | 2/1983 |
| EP | 0159888 A2 | 10/1985 |
| EP | 0353006 A2 | 1/1990 |
| EP | 0561222 A1 | 9/1993 |
| EP | 0401564 B1 | 3/1994 |
| EP | 552132 B1 | 1/1997 |
| EP | 0802865 B1 | 10/1997 |
| EP | 1123817 A2 | 8/2001 |
| EP | 1378377 A2 | 1/2004 |
| EP | 1902866 A1 | 3/2008 |
| EP | 1980420 A1 | 10/2008 |
| EP | 2430252 A1 | 3/2012 |
| FR | 10 476 E | 7/1909 |
| FR | 17 099 E | 6/1913 |
| FR | 2893274 A1 | 5/2007 |
| GB | 2024736 A | 1/1980 |
| GB | 2079685 A | 1/1982 |
| GB | 2305404 A | 4/1997 |
| JP | 01052501 A | 2/1989 |
| JP | 1311902 | 12/1989 |
| JP | 01314602 A | 12/1989 |
| JP | 01314603 A | 12/1989 |
| JP | 2179503 | 7/1990 |
| JP | 03025004 A | 2/1991 |
| JP | 3189202 | 8/1991 |
| JP | 03248901 A | 11/1991 |
| JP | 04027601 A | 1/1992 |
| JP | 04221201 A | 8/1992 |
| JP | 04221202 A | 8/1992 |
| JP | 06-109050 | 4/1994 |
| JP | 07-032827 | 2/1995 |
| JP | 2007112243 | 5/2007 |
| JP | 2007137207 | 6/2007 |
| JP | 2007238019 | 9/2007 |
| JP | 2007331708 | 12/2007 |
| JP | 2008044445 | 2/2008 |
| JP | 2008-068857 * | 3/2008 |
| JP | 2008049943 | 3/2008 |
| JP | 2008132951 | 6/2008 |
| JP | 2008155859 | 7/2008 |
| JP | 2008162495 | 7/2008 |
| JP | 2008222038 | 9/2008 |
| JP | 2008302782 | 12/2008 |
| JP | 2009-269413 | 11/2009 |
| JP | 2009286183 | 12/2009 |
| JP | 2009286208 | 12/2009 |
| JP | 2010137648 | 6/2010 |
| JP | 2011143874 | 7/2011 |
| JP | 2011183842 | 9/2011 |
| JP | 2012045958 | 3/2012 |
| JP | 2012076361 | 4/2012 |
| KR | 2010052990 | 5/2010 |
| NL | 6609460 A | 1/1967 |
| NL | 7006625 A | 11/1970 |
| NO | 864021 A | 10/1986 |
| RU | 2000958 C1 | 10/1993 |
| RU | 2099199 C1 | 12/1997 |

(56) References Cited

FOREIGN PATENT DOCUMENTS

| | | |
|---|---|---|
| RU | 2104880 C1 | 2/1998 |
| RU | 2155677 C2 | 9/2000 |
| RU | 2180290 C2 | 3/2002 |
| RU | 2279986 C1 | 7/2006 |
| SE | 8801421 / 465867 B | 10/1989 |
| SU | 1133121 A1 | 1/1985 |
| WO | WO 9819874 A1 | 5/1998 |
| WO | WO 9843833 A1 | 10/1998 |
| WO | WO 00/13923 | 3/2000 |
| WO | WO 01/42033 A1 | 6/2001 |
| WO | WO 03/018332 A1 | 3/2003 |
| WO | WO 2006/039866 | 4/2006 |
| WO | WO 2006/116807 | 11/2006 |
| WO | WO 2007/057975 | 5/2007 |
| WO | WO 2007/080180 A1 | 7/2007 |
| WO | WO 2007/137375 A1 | 12/2007 |
| WO | WO 2008/050503 | 5/2008 |
| WO | WO 2008/118983 A1 | 10/2008 |
| WO | WO 2009/135561 A2 | 11/2009 |
| WO | WO 2010/135464 A1 | 11/2010 |

OTHER PUBLICATIONS

International Search Report for International Application No. PCT/US2010/042613, dated Mar. 2, 2011, in 4 pages.
Written Opinion for International Application No. PCT/US2010/042613, dated Mar. 2, 2011, in 5 pages.
Chinese Notification of Decision of Rejection for Application No. 200880010003.6, dated Jun. 17, 2011, 15 pages.
International Search Report for Application No. PCT/US2009/058652, dated Nov. 17, 2009, in 2 pages.
Written Opinion for International Application No. PCT/US2009/058652, dated Nov. 17, 2009; 6 pages.
Written Opinion for International Application No. PCT/US2008/058308, dated Aug. 7, 2008; 7 pages.
Chinese Office Action for Chinese Application No. 200880010003.6, dated Dec. 29, 2010; 13 pages.
International Search Report for International Application No. PCT/US2008/058308, dated Aug. 7, 2008; 2 pages.
Jan. 9, 2012 Office Action for U.S. Appl. No. 12/240,918; 8 pages.
Aug. 5, 2010 Non-final Office Action of U.S. Appl. No. 11/691,968; 10 pages.
International Search Report issued by the European Patent Office, for International Application No. PCT/US2013/031153, dated Aug. 29, 2013; 7 pages.
Written Opinion issued by the European Patent Office for International Application No. PCT/US2013/031153, dated Aug. 29, 2013; 10 pages.
International Preliminary Report on Patentability issued by the International Bureau of WIPO, Geneva, Switzerland, for International Application No. PCT/US2008/058308, dated Sep. 29, 2009; 6 pages.
International Preliminary Report on Patentability issued by the International Bureau of WIPO, Geneva, Switzerland, for International Application No. PCT/US2009/058652, dated Mar. 29, 2011; 7 pages.
International Preliminary Report on Patentability issued by the International Bureau of WIPO, Geneva, Switzerland, for International Application No. PCT/US2010/042613, dated Jan. 24, 2012; 6 pages.

* cited by examiner

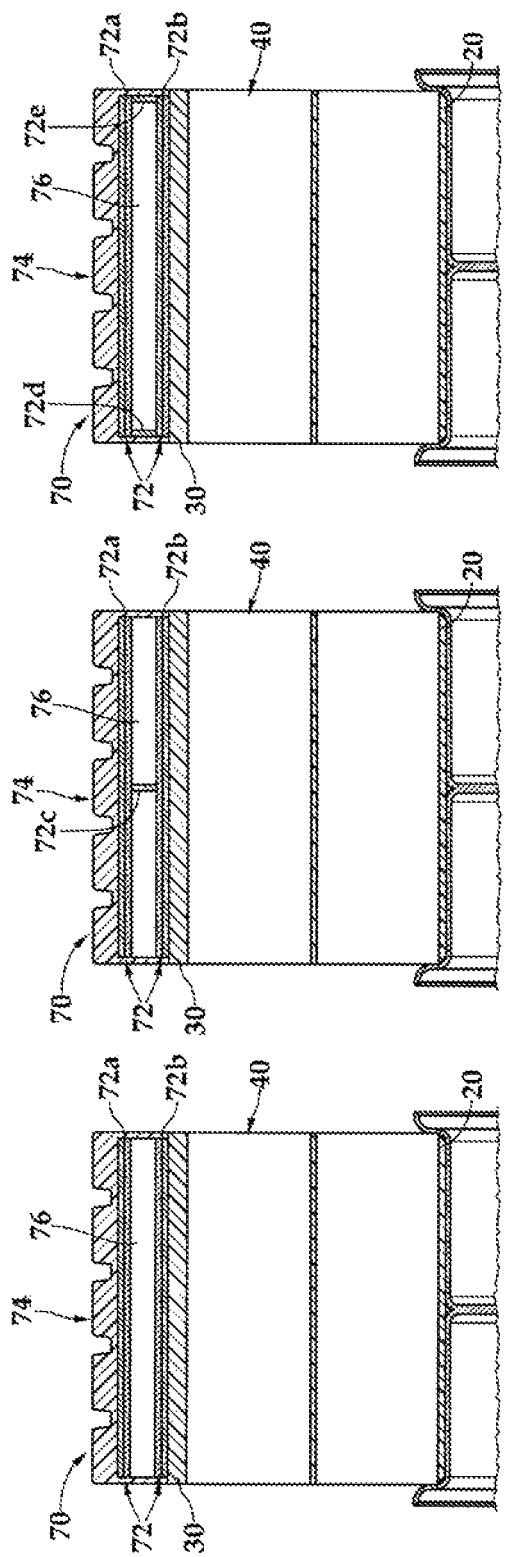

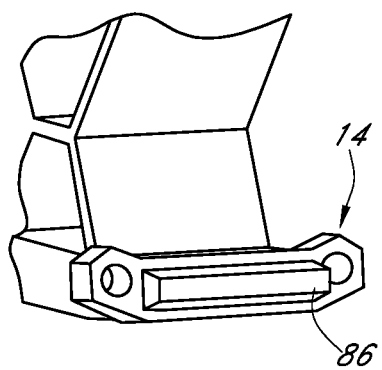 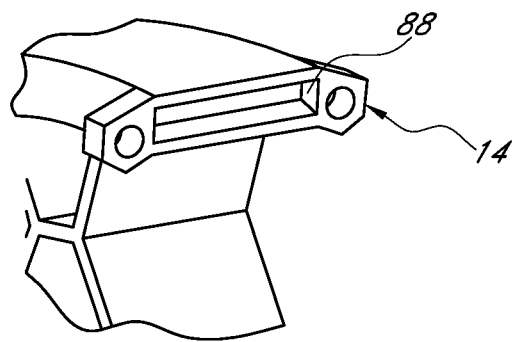
FIG. 10A     FIG. 10B

RUN-FLAT DEVICE

CLAIM OF PRIORITY

This application is a continuation-in-part of U.S. application Ser. No. 12/240,918, filed Sep. 29, 2008, and a continuation-in-part of PCT Application No. PCT/US2009/058652, filed Sep. 28, 2009, the entirety of both of these applications being incorporated by reference herein.

BACKGROUND OF THE INVENTION

1. Field of the Invention

The present application is directed to a run-flat device that is inserted into a tire, and, more specifically, to non-pneumatic run flat device.

2. Description of the Related Art

Run-flat devices allow continued use of a vehicle riding on pneumatic tires in the event that the pneumatic tires are damaged and unable to carry the required load. There are many types of run-flat devices. Most run-flat devices comprise a solid elastomer or rigid metal design that is positioned within an outer shell of the pneumatic tire. Solid elastomer run-flat tires are difficult to install due to their one-piece design and the rigidity of the bead steel in pneumatic tires. Such run-flat devices are also heavy due to their solid design. These run-flat devices therefore add rotating and static mass to the entire wheel assembly. The solid run-flat devices also provide little cushion, resulting in a rough ride, which can damage the vehicle.

Rigid metal designs are typically easier to assemble since they can be made in several pieces but have even less cushion as compared to solid elastomer designs. The increased stiffness with rigid metal designs can also cause problems when the inflated tire is subjected to impact loads or obstacles at speed. In addition, if the run-flat device with a rigid metal design is deformed enough to reach the run-flat, the sudden impact can subject the suspension and vehicle to unacceptable accelerations.

Another type of run-flat tire device relies on providing the tire with a thick sidewall that provides structural support when the tire loses air pressure. However, the thick sidewall results in a harsher ride during normal, pneumatic operation. Such thick sidewall tires also have a limited lifetime after puncture due to the heat generated by the flexing of the sidewall during operations. The event that caused the tire to lose pressure can also affect the structural integrity of the side wall.

SUMMARY

Accordingly, there is a general need to provide an improved run-flat device that addresses one or more of the problems discussed above. Accordingly, in one arrangement there is provided a run-flat insert for insertion into a pneumatic tire. The insert can comprise an inner ring, outer ring, and interconnected web connecting the inner and outer rings. The inner ring can hold the beads of a pneumatic tire in place, such that the run-flat is located within the inflated pneumatic portion of the pneumatic tire during its use.

Another arrangement comprises a run-flat device for use with a pneumatic tire including an inner ring having an axis of rotation. The inner ring comprises at least two annular pieces. A deformable outer ring comprises at least two annular pieces. A support element is positioned between the inner and outer pieces. A stop element is positioned between an interface between the at least two annular pieces and the inner ring to limit deflection of the outer ring towards the inner ring.

Another arrangement comprises a run-flat device for use with a pneumatic tire including an inner ring having an axis of rotation. The inner ring comprises at least two annular pieces. A deformable outer ring comprises at least two annular pieces with at least one opening or channel extending there through. A flexible interconnected web extends between the inner and outer ring and includes at least two annular pieces. A locking mechanism comprises at least one member co-molded with one of the at least two annular pieces of the flexible interconnected web and extends from the flexible interconnected web through the at least one of openings or channel in one of the at least two annular pieces of the outer ring.

In another embodiment, a method of forming a run-flat device may comprise positioning at least a portion of a deformable outer ring comprising at least one opening or channel into a mold. Then, material is added to the mold to form at least a portion of a flexible interconnected web. Then, material used to form at least a portion of the flexible interconnected web is allowed to flow into the at least one opening or channel into the at least one opening or channel to form at least a portion of the deformable outer ring.

In yet another embodiment, a run-flat device for use with a pneumatic tire comprises an inner ring having an axis of rotation. The inner ring comprises at least two annular pieces. A deformable outer ring comprises at least a first annular piece and a second annular piece. A flexible interconnected web extends between the inner and outer ring and comprises at least two annular pieces. An apparatus is positioned between an interface between the first annular piece and the second annular piece of the outer ring. The apparatus comprises a first bushing extending from the first annular piece and a second bushing extending from the second annular piece and surrounds the first and second bushings to connect the first and second annular pieces together.

Another arrangement comprises a run-flat device for use with a pneumatic tire comprising an inner ring having an axis of rotation. The inner ring includes at least two annular pieces. A deformable outer ring comprises at least a first annular piece and a second annular piece. A flexible interconnected web extends between the inner and outer ring and comprises at least two annular pieces. An apparatus is positioned between an interface between the first annular piece and the second annular piece of the outer ring. The apparatus comprises interlocking members extending between the first and second annular pieces of the outer ring.

In another embodiment, a run-flat device for use with a pneumatic tire comprises an inner ring having an axis of rotation. A deformable outer ring comprises a plurality of openings or channels. A flexible interconnected web extends between the inner and outer ring and comprises at least two annular pieces. The outer ring comprises an injection molded material with at least one reinforcing material.

BRIEF DESCRIPTION OF THE DRAWINGS

FIG. 5A is a sectional view of a prior art tread carrying portion.

FIG. 5B is a sectional view of another prior art tread carrying portion.

FIG. 5C is a sectional view of another prior art tread carrying portion.

FIG. 10A is a partial view of a bolt flange and interference joint.

FIG. 10B is a partial view of bolt flange and interference joint.

DETAILED DESCRIPTION OF THE PREFERRED EMBODIMENTS

Figure 1:
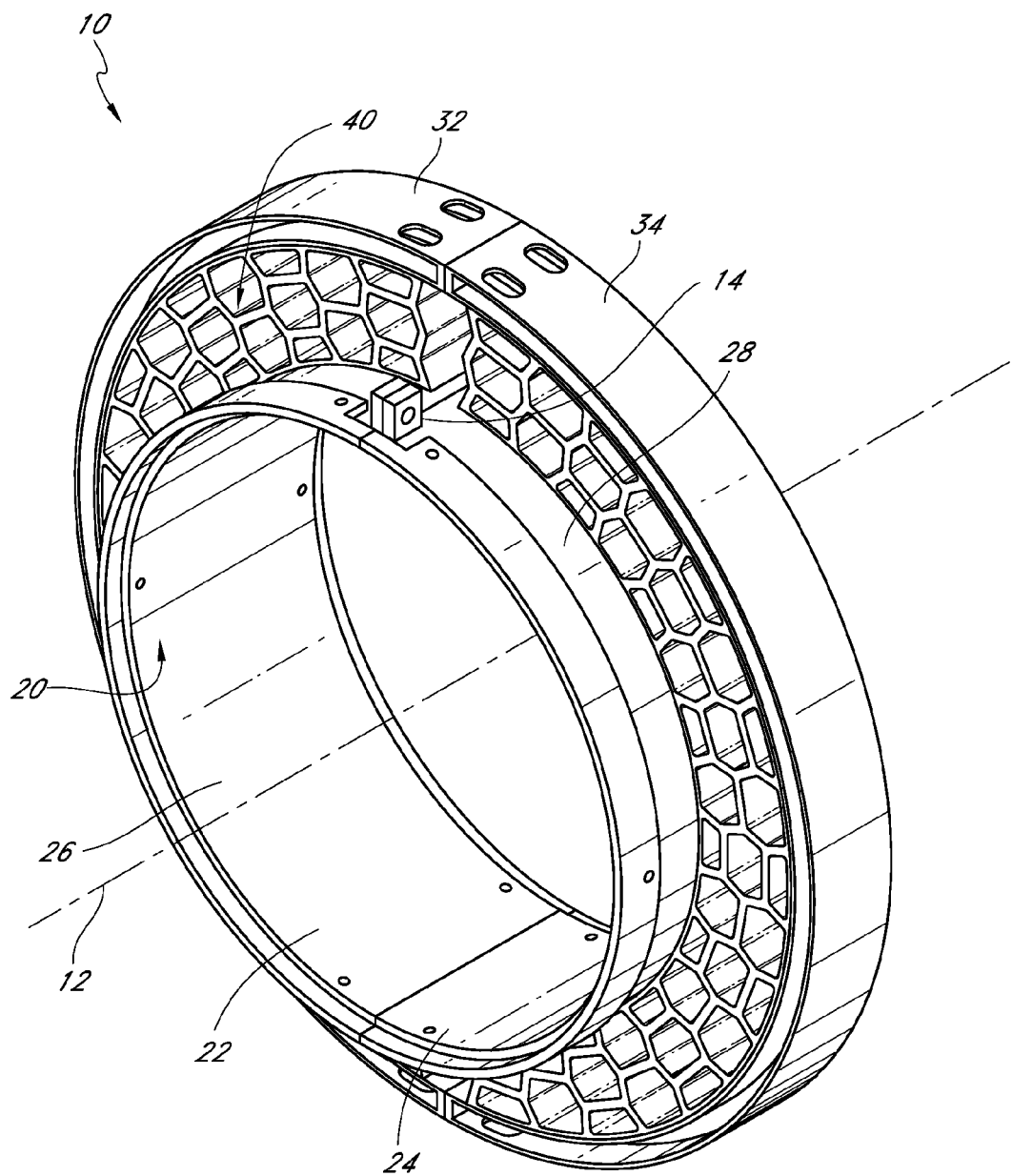
FIG. 1 is a top, front, and left side perspective view of an embodiment of a run-flat device.
Figure 2:
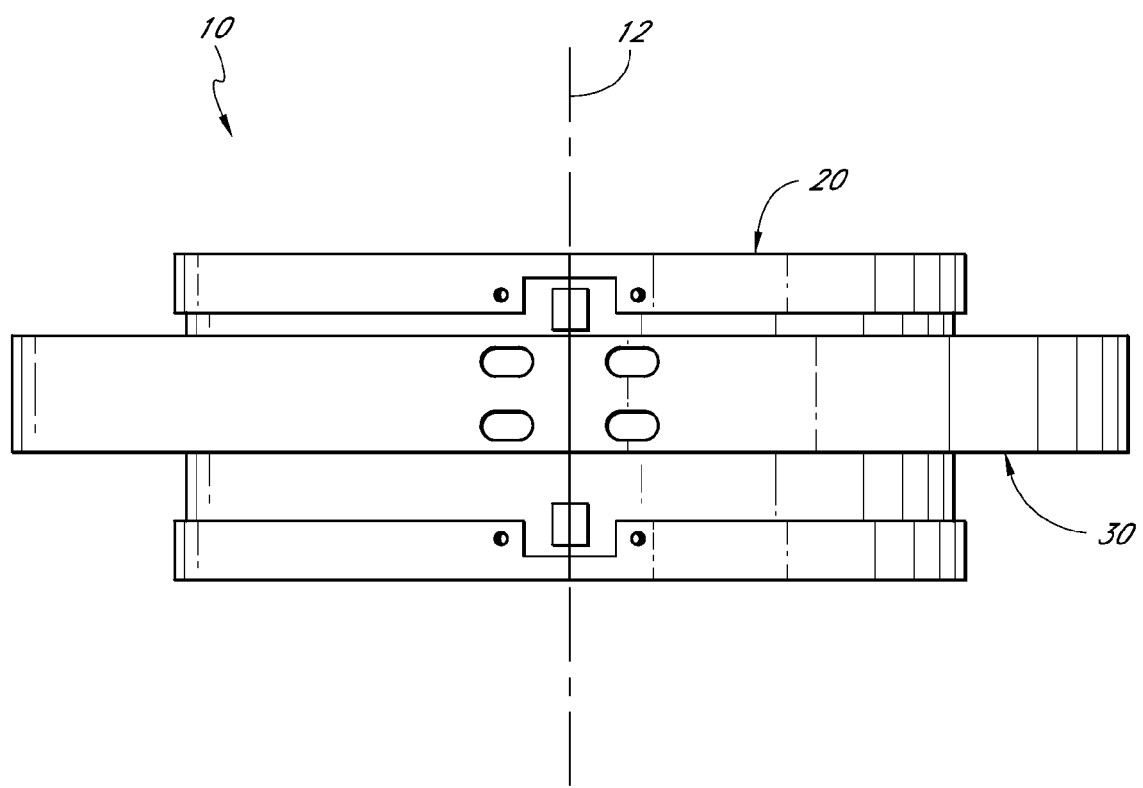
FIG. 2 is a bottom plan view of an embodiment of a run-flat device.
Figure 3:
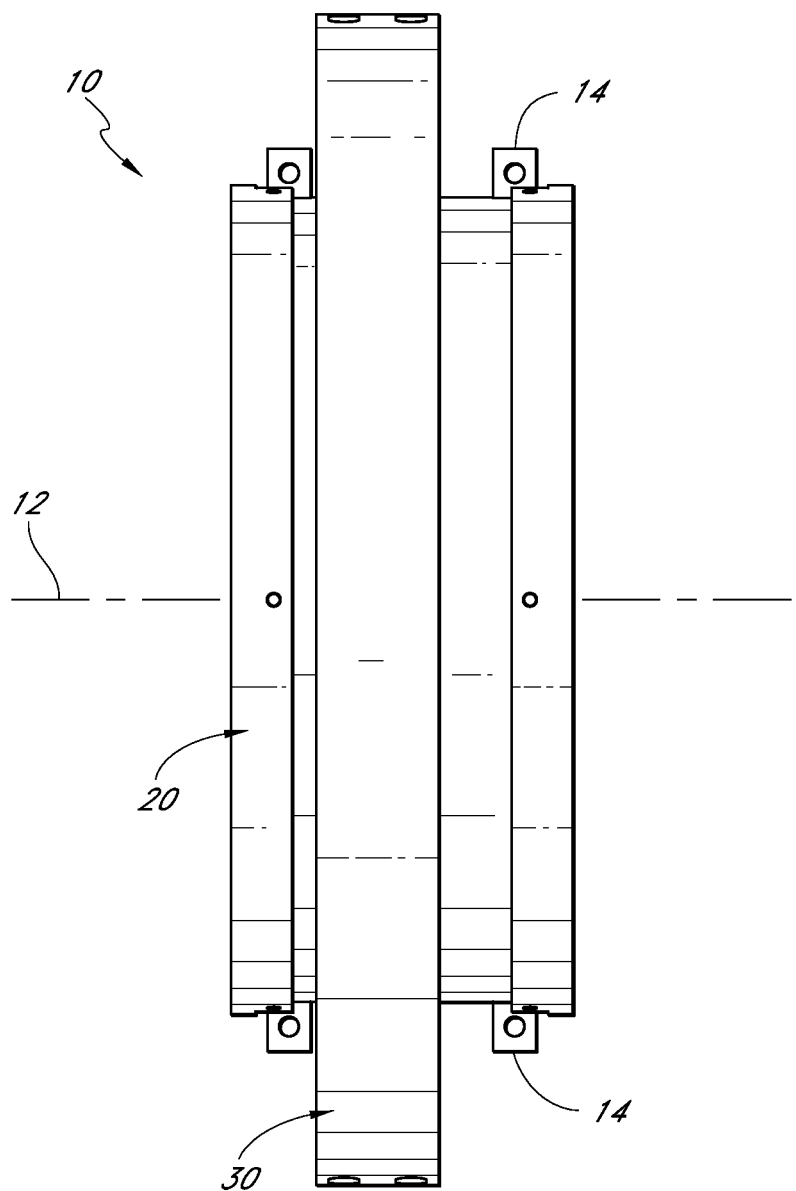
FIG. 3 is a right side elevational view of an embodiment of a run-flat device.

FIGS. 1-4 illustrate one embodiment of a run-flat device 10 for supporting load after a pneumatic tire failure. With initial reference to FIGS. 1, 2 and 3, the run-flat device 10 can generally comprise an inner ring 20, an outer ring 30, and an interconnected web 40 that connects the inner ring 20 and outer ring 30. The run-flat device 10 is typically positioned within a pneumatic tire, which for the sake of clarity is not illustrated in the some of the figures.

The generally annular inner ring 20 can comprise an internal surface 26 and an external surface 28. In a preferred arrangement, the inner ring 20 is configured to be coupled to a rim (not shown) of a tire with an axis of rotation 12. In the illustrated embodiment, the inner ring 20 is divided into two semi-circular parts 22, 24. In this manner, the inner ring 20 can be inserted over the rim of a tire by bringing the two parts 22, 24 together. Once placed around the rim of the tire, the inner ring 20 can be coupled to the rim of the tire in various manners with at least one coupler, including, but not limited to, fasteners, additional clamping devices, adhesives, bonding and/or any combination thereof. In the illustrated embodiment, the inner ring 20 can be supplied with a pair of bolt flanges 14 (See FIG. 3). In this manner, bolts (not shown) can be used with the flanges 14 to secure the two-piece inner ring 12 about the rim of the tire. In one embodiment, the inner ring 20 can be used to attach the beads of a pneumatic tire via compression between the inner ring 20 and the rim.

The inner ring 20 can be made of metal, polymer, or other suitable material. As noted above, in the illustrated embodiment, the inner ring 20 can be formed by combining two pieces together. In other embodiments, the inner ring 20 can be formed by more than two pieces. In other embodiments, the inner ring 20 can be formed from a single piece that is slipped over the rim of the tire (e.g., through a press or slip fit) or otherwise positioned around the rim of the tire.

With continued reference to FIGS. 1-4, the outer ring 30 can be made of metal, polymer, or other suitable material, and in some embodiments can be deformable. The polymer can be, for example, a thermoplastic, such as a thermoplastic elastomer, a thermoplastic urethane, or a thermoplastic vulcanizate. "Polymer," as referred to herein, refers to both cross-linked and/or uncross-linked polymers. The outer ring 30 can also be made of rubber, polyurethane, and/or any other suitable material. As will be explained below, the outer ring 30 is advantageously stiff enough to distribute some load from the footprint region of the interconnected web 40 to the rest of the web. That is, in one embodiment, the outer ring 30 is configured to deform in an area around and including a footprint region (not shown) of the run-flat 10. This arrangement decreases vibration and increases ride comfort.

The outer ring 30 can have a section in the shape of an I-beam, box, C-channel, or any other shape that provides bending stiffness. In the illustrated embodiment, the outer ring 30 comprises an inner portion and an outer portion, the inner and outer portions forming two C-channels around the interconnected web 40. Both the inner and outer portions of the outer ring 30 can be formed from the same, or different, material. In one embodiment, the parts of the inner and outer rings are bolted together, but in other embodiments, they can be joined by adhesives and/or other coupling structures and/or provided within interlocking joints.

As with the inner ring 20, the outer ring 30 can be made as pieces such that it can be inserted around an existing rim of a tire. In the illustrated embodiment, the outer ring comprises two pieces 32 and 34. The outer ring 30 can be coupled to the rim of the tire in various manners, including, but not limited to, fasteners, additional clamping devices, adhesives, bonding and/or any combination thereof. For example, the outer ring 30 can be supplied with a pair of bolt flanges (not shown). In this manner, bolts (not shown) can be used with the flanges to secure the two-piece inner ring 12 about the rim of the tire. In one embodiment, the web 40 and outer ring 30 are formed together with corresponding pieces of the inner ring 20. In this manner, the mechanism used to secure the inner ring 20, web 40, or outer ring 30 together can be used to secure the other remaining parts together. In other embodiments, parts of the web 40 do not need to be coupled together across a joint but only secured between the inner and outer rings 30. In still other embodiments, the outer ring 30 can be formed in more than two pieces. In other embodiments, the outer ring 30 can be formed into a single piece.

In other embodiments, the outer ring 30 can be made of, or include, rubber and/or belts. For example, the outer ring 30 can have a radially external surface to which a rubber tread carrying layer is attached as described below. Attachment of the tread carrying layer to the outer ring 30 can be accomplished adhesively, for example, or by using other methods commonly available in the art. As described below, in some embodiments, the tread carrying layer can comprise embedded reinforcing belts to add increased overall stiffness to the run-flat device 10, wherein the embedding of the reinforcing belts is accomplished according to methods commonly available in the art. Reinforcing belts can be made of steel or other strengthening materials.

In still other embodiments, a friction and/or wear reducing element can be provided over the outer ring 30. The purpose of such an element is to reduce the friction and/or wear of the run-flat device 10 against the inside of the tire that has been damaged. In one embodiment, a polyurethane ring can be molded or otherwise positioned over the outer ring 30. Such a ring can include tread-like patterns or be generally smooth.

In one embodiment, the generally annular inner ring 20 and a generally annular outer ring 30 are made of the same material as the interconnected web 40. In such an embodiment, the generally annular inner ring 20, generally annular outer ring 30, and the interconnected web 40 can be made by injection or compression molding, castable polymer, or any other method generally known in the art; and can be formed at the same time so that their attachment is formed by the material comprising the inner ring 20, the outer ring 30, and the interconnected web 40 cooling and setting. In such embodiments, the inner ring 20, an outer ring 30 and web 40 can be formed in one or more pieces as described above. In other embodiments, the web 40 can be formed with the inner ring 20 or with the outer ring 30 to form a subcomponent.

Figure 4:
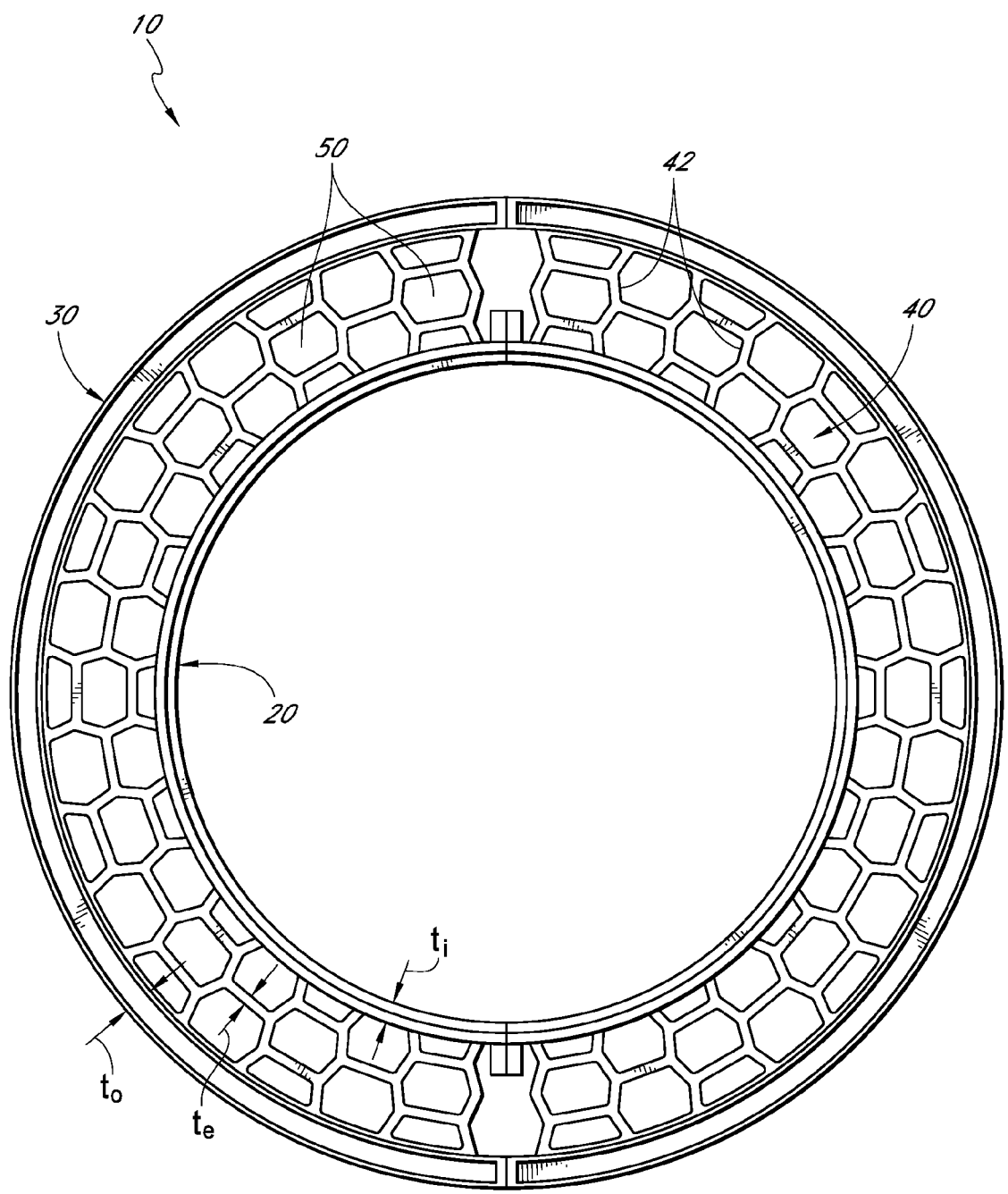
FIG. 4 is a front side elevational view of an embodiment of a run-flat device.
Figure 4A:
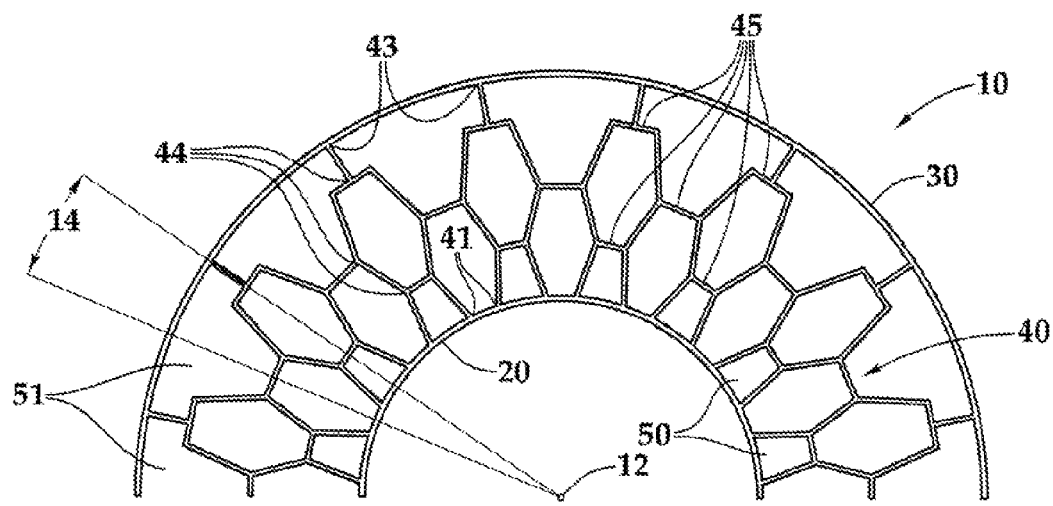
FIG. 4A is a front view of another embodiment of a run-flat device.
Figure 4B:
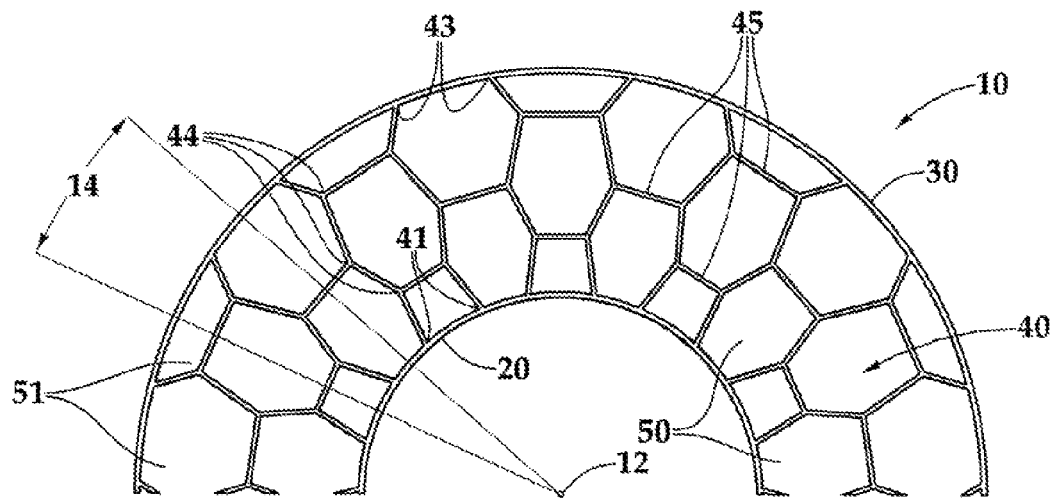
FIG. 4B is a front view of another embodiment of a run-flat device.
Figure 4C:
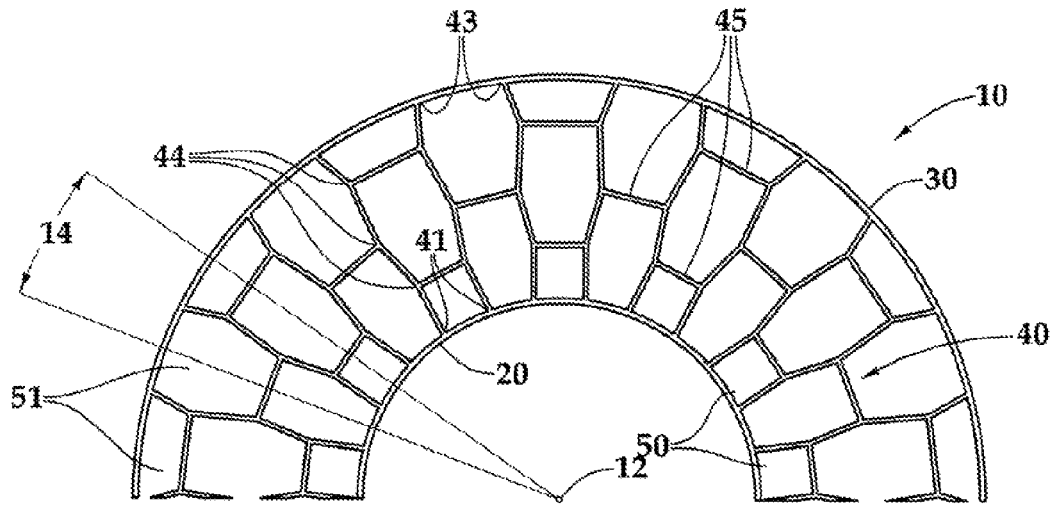
FIG. 4C is a front view of another embodiment of a run-flat device.
Figure 4D:
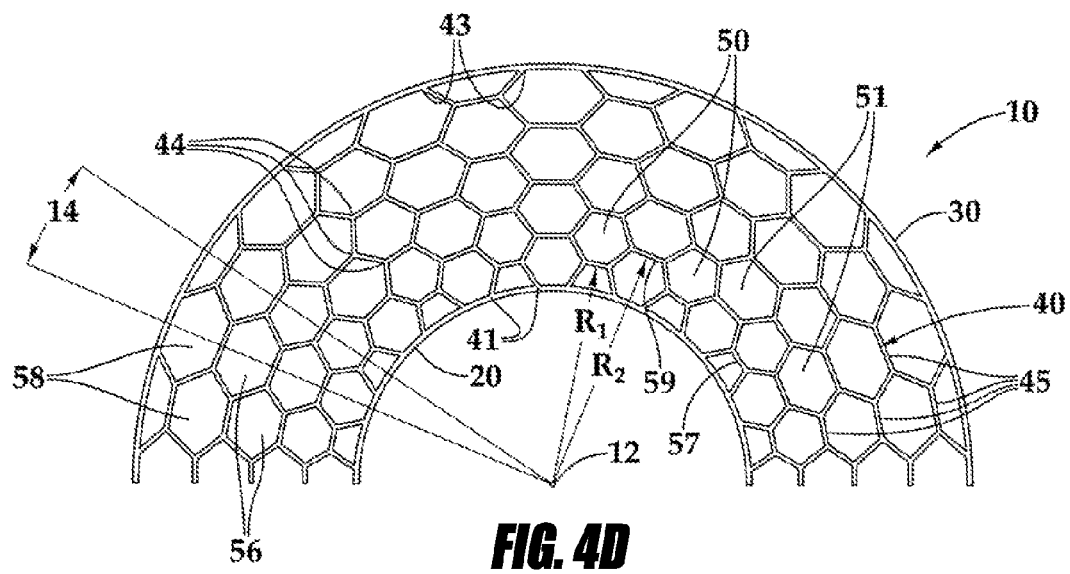
FIG. 4D is a front view of another embodiment of a run-flat device.
Figure 4E:
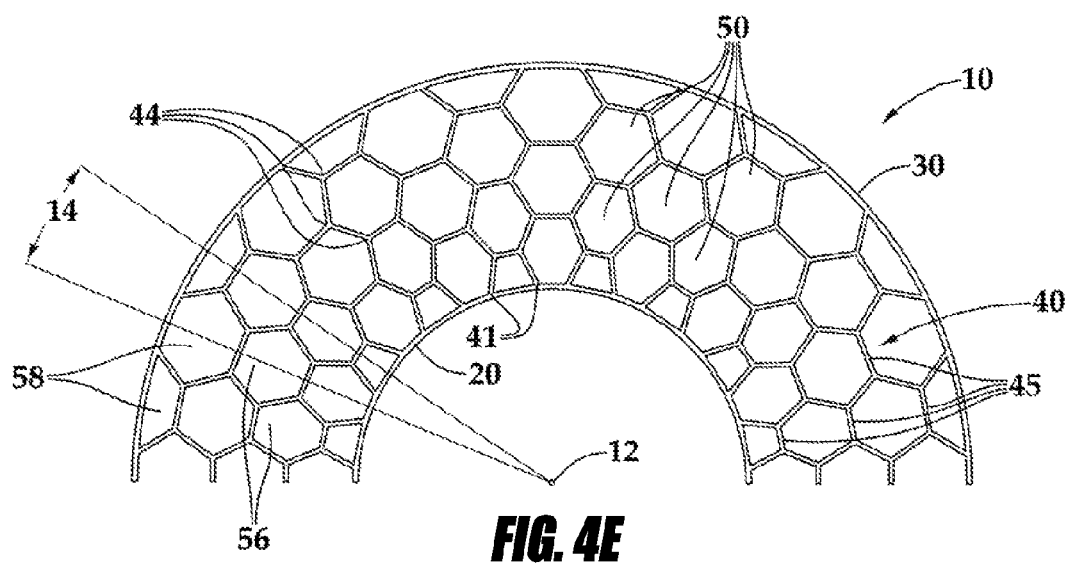
FIG. 4E is a front view of another embodiment of a run-flat device.
Figure 4F:
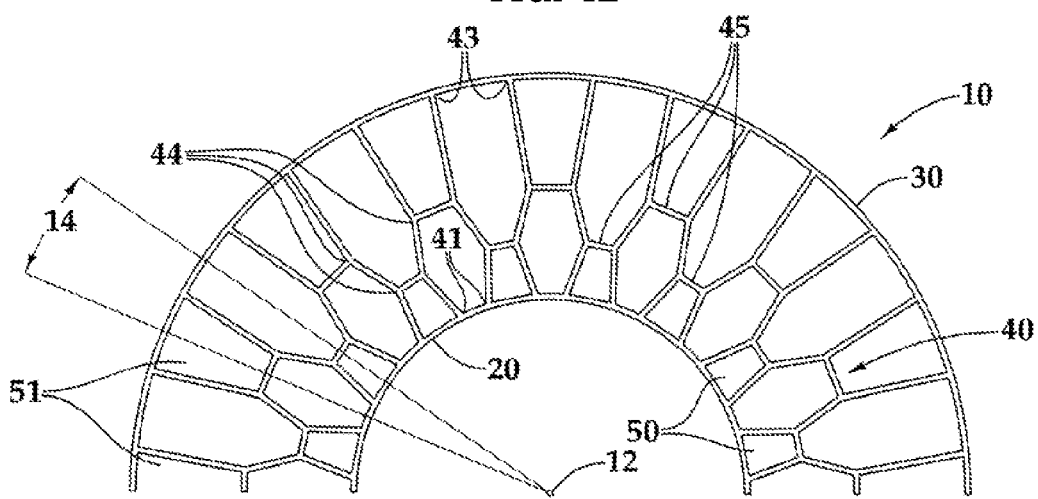
FIG. 4F is a front view of another embodiment of a run-flat device.
Figure 4G:
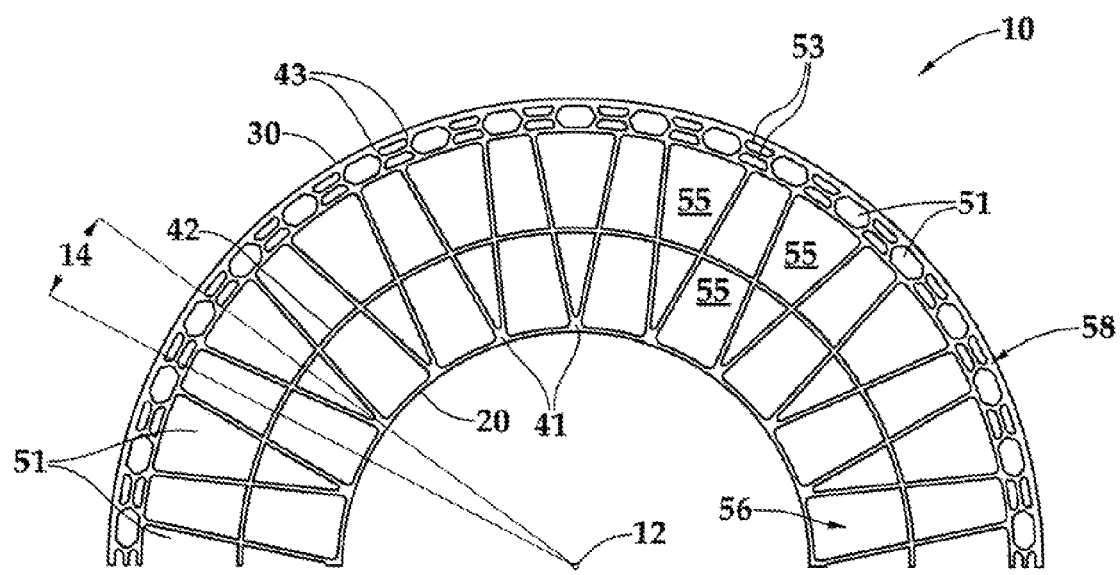
FIG. 4G is a front view of another embodiment of a run-flat device.
Figure 4H:
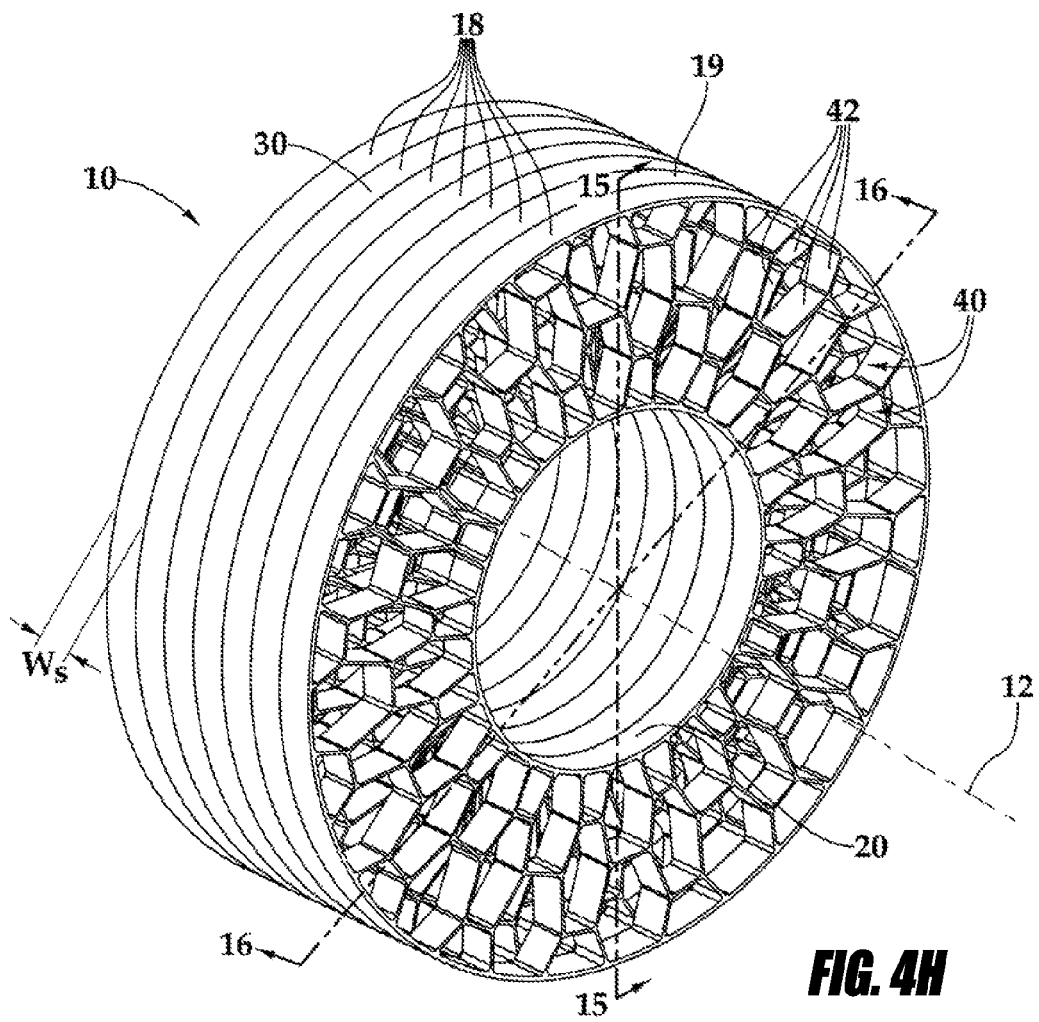
FIG. 4H is a perspective view of an embodiment of a run-flat device with circumferentially offset segments.

With reference to FIGS. 1-4H, and incorporating by reference herein the entirety of U.S. patent application Ser. Nos. 11/691,968 (RSLNT.001A) and 12/055,675 (RSLNT.001CP1), the interconnected web 40 of the run-flat device 10 connects the generally annular inner ring 20 to the generally annular outer ring 30. With reference to FIG. 4D, the interconnected web 40 comprises at least two radially adjacent layers 56, 58 of web elements 42 that define a plurality of generally polygonal openings 50. In other words, with at least two adjacent layers 56, 58, a slice through any radial portion of the run-flat device 10 extending from the axis of the rotation 12 to the generally annular outer ring 30 passes through or traverses at least two generally polygonal openings 50. The polygonal openings 50 can form various shapes, some of which are shown in FIGS. 4-4H. In many embodiments, a majority of generally polygonal openings 50 can be generally hexagonally shaped with six sides. However, it is possible that each one of the plurality of generally polygonal openings 50 has at least three sides. In one embodiment, the plurality of generally polygonal openings 50 are either generally hexagonal in shape or hexagonal in shape circumferentially separated by openings that are generally trapezoidal in shape, as can be seen in FIG. 4A, giving the interconnected web 40 a shape that can resemble a honeycomb.

A preferred range of angles between any two interconnected web elements (moving radially from the tread portion of the tire to the wheel) can be between 60 and 180 degrees (See, for example, the web elements of FIG. 4A). Other ranges are also possible.

With continued reference to the illustrated embodiments of FIGS. 4-4H, the interconnected web 40 can be arranged such that one web element 42 connects to the generally annular inner ring 20 at any given point or line along the generally annular inner ring 20 such that there are a first set of connections 41 along the generally annular inner ring 20. Likewise, one web element 42 can connect to the generally annular outer ring 30 at any given point or line along an internal surface of the generally annular outer ring 30 such that there are a second set of connections 43 along the generally annular outer ring 30. However, more than one web element 42 can connect to either the generally annular inner ring 20 or to the generally annular outer ring 30 at any given point or line.

As shown in FIGS. 4-4H, the interconnected web 40 can further comprise intersections 44 between web elements 42 in order to distribute applied load, L, throughout the interconnected web 40. In these illustrated embodiments, each intersection 44 joins at least three web elements 42. However, in other embodiments, the intersections 44 can join more than three web elements 42, which can assist in further distributing the stresses and strains experienced by web elements 42.

With continued reference to FIGS. 4-4H, the web elements 42 can be angled relative to a radial plane 16 containing the axis of rotation 12 that also passes through web element 42. By angling the web elements 42, applied load, L, which is generally applied perpendicular to the axis of rotation 12, can be eccentrically applied to the web elements 42. This can create a rotational or bending component of an applied load on each web element 42, facilitating buckling of those web elements 42 subjected to a compressive load. Similarly situated web elements 42 can all be angled by about the same amount and in the same direction relative to radial planes 16. Preferably, however, the circumferentially consecutive web elements 42, excluding tangential web elements 45, of a layer of plurality of generally polygonal openings 50 are angled by about the same magnitude but measured in opposite directions about radial planes, such that web elements 42 are generally mirror images about radial plane 16 of one another.

Each of the openings within the plurality of generally polygonal tubular openings 50 can, but is not required, to be similar in shape. FIG. 4D, for example, shows a first plurality of generally polygonal openings 50 that is different in shape from a second plurality of generally polygonal openings 51. In this embodiment, at least one opening of the first plurality of general polygonal openings 50 can be smaller than at least one opening of the second plurality of generally polygonal openings 51. FIG. 4D also shows that each generally polygonal opening in the first plurality of generally polygonal openings 50 has an inner boundary 57 spaced a radial distance, $R_1$, from axis of rotation 12 and each generally polygonal opening in the second plurality of generally polygonal openings 51, has a second inner boundary 59 spaced a radial distance, $R_2$, which can be greater than $R_1$, from axis of rotation 12.

The number of openings 50 within the interconnected web 40 can vary. For example, the interconnected web 40 can have five differently sized openings patterned 16 times for a total of 80 cells. In yet other embodiments, other numbers of openings 50 can be used other than 16. For example, in preferred embodiments, the interconnected web 40 could include between 12 and 64 patterns of cells. Other numbers outside of this range are also possible.

As shown in FIGS. 4D and 4E, openings in a radially inner layer 56 can be similarly shaped as compared to those in a radially outer layer 58 but can be sized differently from those openings, such that the generally polygonal openings 50 increase in size when moving from opening to opening in a radially outward direction. However, turning to FIG. 4G, a second plurality of generally polygonal openings 51 in a radially outer layer 58 can also be smaller than those in a first plurality of generally polygonal openings 50 in a radially inner layer 56. In addition, the second plurality of generally polygonal openings can be either circumferentially separated from each other by a third plurality of generally polygonal openings 53 or can be greater in number than the first plurality of generally polygonal openings 50, or it can be both.

As noted above, FIGS. 4-4F show several variations of a plurality of generally polygonal openings 50 that are generally hexagonally shaped. As shown, these openings can be symmetrical in one direction or in two directions, or, in another embodiment, they are not symmetrical. For example, in FIG. 4A, radial symmetry planes 14 bisect several of the plurality of generally polygonal openings 50. Those openings are generally symmetrical about radial symmetry planes 14. However, interconnected web 40 of run-flat device 10 can also be generally symmetrical as a whole about radial symmetry planes. In comparison, a second plurality of generally polygonal openings 14 can be generally symmetrical about similar radial symmetry planes 14. In addition, as shown in FIGS. 4D and 4E, a second plurality of generally polygonal openings can be generally symmetrical about lines tangent to a cylinder commonly centered with axis of rotation 12, providing a second degree of symmetry.

The web elements 42 can have significantly varying lengths from one embodiment to another or within the same embodiment. For example, the interconnected web 40 in FIG. 4D comprises web elements 42 that are generally shorter than web elements of the interconnected web shown in FIG. 4C. As a result, interconnected web 40 can appear denser in FIG. 4D, with more web elements 42 and more generally polygonal openings 50 in a given arc of run-flat device 10. In comparison, FIGS. 4F and 4G both show interconnected webs 40 with web elements 42 that substantially vary in length within the same interconnected web. In FIG. 4F, radially inward web elements 42 are generally shorter than web elements 42 located comparatively radially outward. However, FIG. 4G shows radially inward web elements 42 that are substantially longer than its radially outward web elements 42. As a result, interconnected web 40 of FIG. 4F appears more inwardly dense than interconnected web 42 of FIG. 4G.

Remaining with FIG. 4G, an interconnected web 40 is shown such that web elements 42 define a radially inner layer 56 of generally polygonal openings 50 that is significantly larger than a radially outer layer 58 of generally polygonal openings 50. Radially inner layer 56 can comprise alternating wedge-shaped openings 55 that may or may not be similarly shaped. As shown, a second plurality of generally polygonal openings 51 can be separated from first plurality of generally polygonal openings 50 by a generally continuous web element 42 of interconnected web 40 spaced at a generally constant radial distance from the axis of rotation 12. The generally continuous, generally constant web element 42 can assist in providing further stiffness to the run-flat device 10 in regions that are resistant to deformation.

With reference to FIGS. 4-4H, the combination of the geometry of interconnected web 40 and the material chosen in interconnected web 40 can enable an applied load, L, to be distributed throughout the web elements 42. Because the web elements 42 are preferably relatively thin and can be made of a material that is relatively weak in compression, those elements 42 that are subjected to compressive forces may have a tendency to buckle. These elements are generally between the applied load, L, that generally passes through axis of rotation 12 and the footprint region.

In one embodiment, some or all of the web elements 42 can be provided with weakened (e.g., previously bent) or thinned sections, such that the web elements 42 preferentially bend and/or are biased to bend in a certain direction. For example, in one embodiment, the web elements are biased such that they bend generally in an outwardly direction. In this manner, web elements do not contact or rub against each other as they buckle. In addition, the position of the weakened or thinned portion can be used to control the location of the bending or buckling to avoid such contact.

When buckling occurs, the remaining web elements 42 may experience a tensile force. It is these web elements 42 that support the applied load L. With reference to FIGS. 5A-5C, although relatively thin, because web elements 42 can have a high tensile modulus, E, they can have a smaller tendency to deform, but instead can help maintain the shape of a tread carrying layer 70 or outer ring 30. In this manner, the tread carrying layer 70 and/or outer ring 30 can support the applied load L on the device 10 as the applied load L is transmitted by tension through the web elements 42. The tread carrying layer 70 and/or outer ring 30, in turn, acts as an arch and provides support. Accordingly, the tread carrying layer 70 and/or outer ring 30 is preferably sufficiently stiff to support the web elements 42 that are in tension and supporting the load L. Preferably, a substantial amount of said applied load L is supported by the plurality of said web elements working in tension. For example, in one embodiment, at least 75% of the load is supported in tension, in another embodiment at least 85% of the load is supported in tension and in another embodiment at least 95% of the load is supported in tension with the balance in compression. In other embodiments, less than 75% of the load can be supported in tension.

With reference to FIG. 4, although the generally annular inner ring 20, the generally annular outer ring 30, and the interconnected web 40 can be comprised of the same material; they can all have different thicknesses. That is, the generally annular inner ring can have a first thickness, $t_i$; the generally annular outer ring can have a second thickness, $t_o$; and the interconnected web can have a third thickness, $t_e$. As shown in FIG. 4, in one embodiment, the first thickness $t_i$ can be less than the second thickness $t_o$. However, the third thickness, $t_e$, can be less than either first thickness, $t_i$, or the second thickness, $t_o$. This illustrated arrangement is presently preferred, as a thinner web element 42 buckles more easily when subjected to a compressive force, whereas a relatively thicker generally annular inner ring 20 and the generally annular outer ring 30 can advantageously help maintain lateral stiffness of the run-flat device 10 in an unbuckled region by better resisting deformation. In another embodiment, the thickness of the web $t_e$ can vary within the web 40. For example, in one embodiment, the web thickness $t_e$ decreases as the radial distance from the center of the device 10 is increased such that the web provides increasing resistance as it is deformed inwardly. In other embodiments, this relationship is reversed. In still other embodiments, the web is thicker or thinner in the radially middle portions as compared to the inner and outer portions of the web 40.

The thickness, $t_e$, of web elements 42 can vary, depending on predetermined load capability requirements. For example, as the applied load, L, increases, the web elements 42 can increase in thickness, $t_e$, to provide increased tensile strength, reducing the size of the openings in the plurality of generally polygonal openings 50. However, the thickness, $t_e$, should not increase too much so as to inhibit buckling of those web elements 42 subject to a compressive load. However, in certain embodiments (as described above), it can be desirable to have some or a significant amount of the load supported by the web elements 42 in compression. In such embodiments, the thickness, $t_e$ can be increased and/or the shape of the web elements 42 changed so as to provide resistance to a compressive load. In addition, the material selection can also be modified so as to provide for the web elements supporting a compressive load.

As with choice of material, the thickness, $t_e$, can increase significantly with increases in the applied load L. For example, in certain non-limiting embodiments, each web element 42 of interconnected web 40 can have a thickness, $t_e$ between about 0.04 and 0.1 inches for device loads of about 0-1000 lbs, between about 0.1 and 0.25 inches for loads of about 500-5000 lbs, and between 0.25 and 0.5 inches for loads of about 2000 lbs or greater. Those of skill in the art will recognize that these thicknesses can be decreased or increased in modified embodiments.

In addition to the web elements 42 that are generally angled relative to radial planes 16 passing through the axis of rotation 12, the interconnected web 40 can also include tangential web elements 45, as shown in FIGS. 4-4F. The tangential web elements 45 can be oriented such that they are generally aligned with tangents to cylinders or circles centered at the axis of rotation 12. The tangential web elements 45 are preferred because they assist in distributing applied load, L. For example, when the applied load, L, is applied, the web elements 42 in a region above axis of rotation 12 are subjected to a tensile force. Without the tangential web elements 45, interconnected web 40 may try to deform by having the other web elements 42 straighten out, orienting themselves in a generally radial direction, resulting in stress concentrations in localized areas. However, by being oriented in a generally tangential direction, the tangential web elements 45 distribute the applied load, L, throughout the rest of interconnected web 40, thereby minimizing stress concentrations.

Staying with FIGS. 4-4F, the plurality of generally polygonal openings 50 are shown wherein each one of said plurality of generally polygonal openings 50 is radially oriented. As noted above, the generally polygonal openings 50 can be oriented such that they are symmetrical about radial symmetry planes 14 that pass through axis of rotation 12. This arrangement can facilitate installation by allowing device 10 still to function properly even if it is installed backwards, because it should behave in the same manner regardless of its installed orientation.

FIG. 4H shows a perspective view of an embodiment where the run-flat device 10 comprises a plurality of segments 18. Each segment 18 can have a generally uniform width, $W_S$, but each also can have different widths in modified embodiments. The segments 18 can be made from the same mold so as to yield generally identical interconnected webs 40, but they can also be made from different molds to yield varying patterns of interconnected webs 40.

The choice of materials used for interconnected web 40 may be an important consideration. In one embodiment, the material that is used will buckle easily in compression, but be capable of supporting the required load in tension. Preferably, the interconnected web 40 is made of a cross-linked or uncross-linked polymer, such as a thermoplastic elastomer, a thermoplastic urethane, or a thermoplastic vulcanizate. More generally, in one embodiment, the interconnected web 40 preferably can be made of a relatively hard material having a Durometer measurement of about 80 A-95 A, and/or in one embodiment 92A (40D) with a high tensile modulus, E, of about 21 MPa or about 3050 psi or in other embodiments between about 1000 psi to about 8000 psi. However, tensile modulus can vary significantly for rubber or other elastomeric materials, so this is a very general approximation. In addition, Durometer and tensile modulus requirements can vary greatly with load capability requirements.

The polymer materials discussed above for the interconnected web 40, the inner ring 20, and/or the outer ring 30 additionally can include additives configured to enhance the performance of the device 10. For example, in one embodiment, the polymer materials can include one or more of the following: antioxidants, light stabilizers, plasticizers, acid scavengers, lubricants, polymer processing aids, antiblocking additives, antistatic additives, antimicrobials, chemical blowing agents, peroxides, colorants, optical brighteners, fillers and reinforcements, nucleating agents, and/or additives for recycling purposes.

Other advantages can be obtained when using a polymer material such as polyurethane in the device 10 instead of the rubber of traditional devices. A manufacturer of the illustrated embodiments can need only a fraction of the square footage of work space and capital investment required to make rubber tires. The amount of skilled labor necessary can be significantly less than that of a rubber tire plant. In addition, waste produced by manufacturing components from a polyurethane material can be substantially less than when using rubber. This is also reflected in the comparative cleanliness of polyurethane plants, allowing them to be built in cities without the need for isolation, so shipping costs can be cut down. Furthermore, products made of polyurethane can be more easily recyclable.

Cross-linked and uncross-linked polymers, including polyurethane and other similar nonrubber elastomeric materials can operate at cooler temperatures, resulting in less wear and an extended fatigue life of device 10. For example, polyurethane has good resistance to ozone, oxidation, and organic chemicals, as compared to rubber.

In other embodiments, the interconnected web 40 comprises web elements 42 that also contain strengthening components 46 such as carbon fibers, KEVLAR®, and/or some additional strengthening material to provide additional tensile strength to the interconnected web 40. Properties of the strengthening components 46 for certain embodiments can include high strength in tension, low strength in compression, light weight, good fatigue life, and/or an ability to bond to the material(s) comprising the interconnected web 40.

Figure 4I:
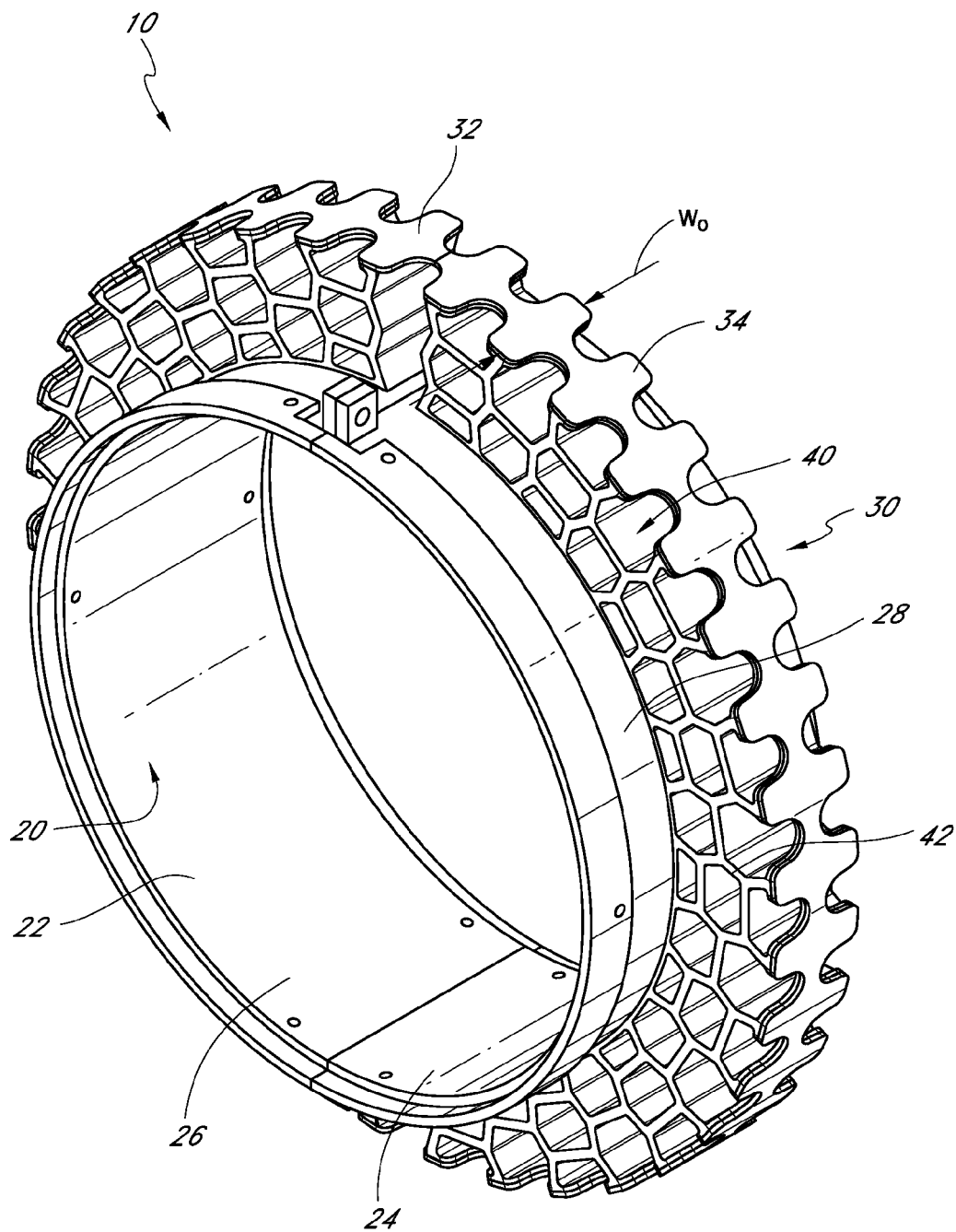
FIG. 4I is a top, front, and left side perspective view of another embodiment of a run-flat device.

FIG. 4I illustrates another modified embodiment. In this embodiment, the width $w_o$ varies along the circumference of the outer ring 30. Specifically, in this embodiment, the outer ring 30 is thicker at portions that are connected to a web element 42 and thinner between web elements 42. In this manner, the weight of the outer ring 30 and material used can be reduced. In other embodiments, it is anticipated that the inner ring 20 and/or web elements 42 can also have varying widths along their respective circumferences. In other embodiments, the inner ring 20, outer ring 30 and web element 40 can also have varying widths with respect to each other. For example, in one embodiment the web element 40 has a smaller width than the outer and inner rings 30, 20. In yet another embodiment, the web element 40 has a width that varies radially with respect to the longitudinal axis of the device. For example, in one embodiment, the width is wider near the outer and inner rings 30, 20 as compared to the middle portions of the web element 40. In other embodiments, this relationship can be reversed.

FIGS. 5A-5C show several possible examples of the arrangement of the reinforcing belts 72 in the tread carrying layer 70. FIG. 5A is a version showing a tread 74 at a radially outermost portion of the device 10. Moving radially inwardly are a plurality of reinforcing belts 72a, a layer of support material 76, which forms a shear layer, and a second plurality of reinforcing belts 72b. In this embodiment, the reinforcing belts 72a, 72b are arranged so that each belt is a generally constant radial distance from the axis of rotation 12.

Turning to the embodiment of FIG. 5B, a tread carrying layer 70 similar to that of FIG. 5A is shown. However, the embodiment of FIG. 5B shows the layer of support material 76 being approximately bisected in a generally radial direction by at least one transverse reinforcing belt 72c. Support material 76 can be a rubber, polyurethane, and/or similar compound, such that as a footprint is formed by the device, the support material 76 between the reinforcing belts 72 is subjected to a shear force. Thus, the support layer 76 provides the tread carrying layer 70 with increased stiffness.

The tread carrying layer 70 of FIG. 5C resembles that of FIG. 5A but comprises two additional groupings of reinforcing belts 72. In addition to the generally radially constant plurality of reinforcing belts 72a, 72b, the tread carrying layer 70 in FIG. 5C includes transverse reinforcing belts 72d, 72e. The transverse reinforcing belts 72d, 72e include at least one reinforcing belt 72d proximate a longitudinally inner surface and at least one reinforcing belt 72e proximate a longitudinally outer surface, such that reinforcing belts 72a, 72b, 72d, 72e generally enclose a layer of support material 76 in a generally rectangular box shape.

The reinforcing belts 72 and the support material 76 as described above generally form a shear layer. As a footprint is formed by the device, the support material 76 between the reinforcing belts is subjected to a shear force. Thus, the support layer 75 provides the tread carrying layer with increased stiffness.

In one embodiment, the shear layer (support material) 76 has a thickness that is in the range from about 0 inches (i.e., no shear layer) to about 1 inch think (as measured along a radius extending from the axis of rotation). In other heavy load applications, the shear layer 76 can have a thickness greater than 1 inch.

The interconnected web 40, the generally annular inner ring 20, and the generally annular outer ring 30 can be molded all at once to yield a product that has a width or depth of the finished non-pneumatic device. However, the interconnected web 40, the generally annular inner ring 20, and the generally annular outer ring 30 can be manufactured in steps and then assembled.

Figure 6:
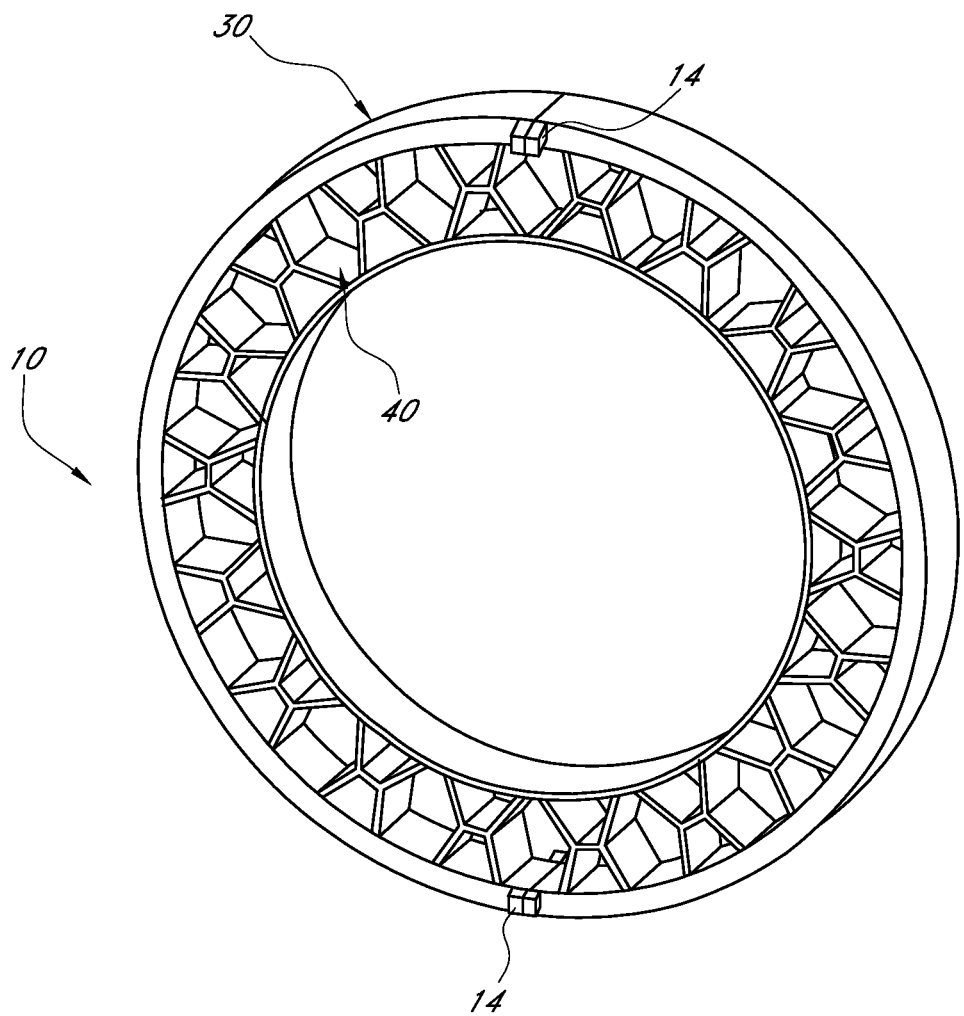
FIG. 6 is a top, front, and left side perspective view of another embodiment of a run-flat device.
Figure 6A:
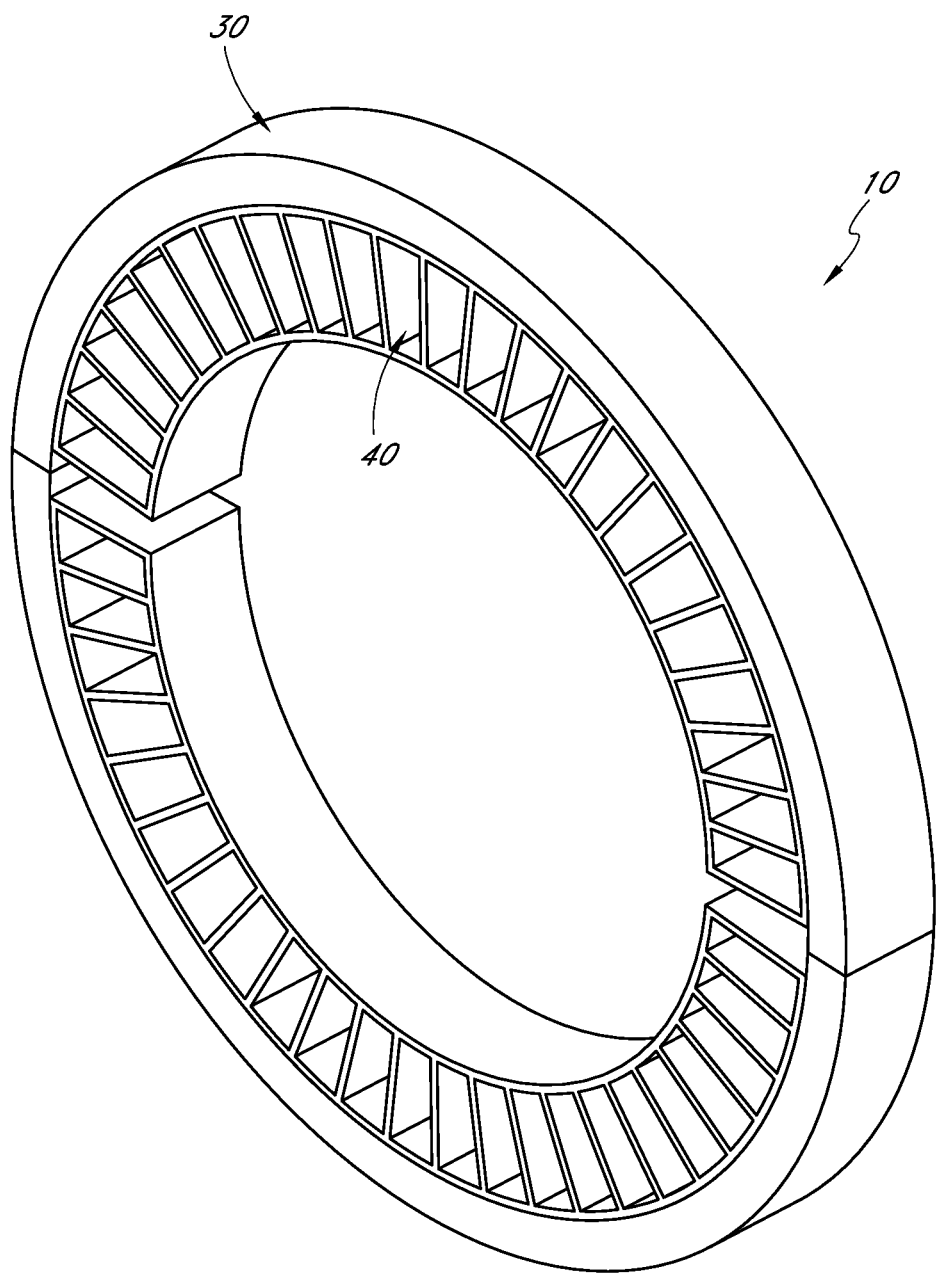
FIG. 6A is a top, front, and left side perspective view of another embodiment of a run-flat device.
Figure 6B:
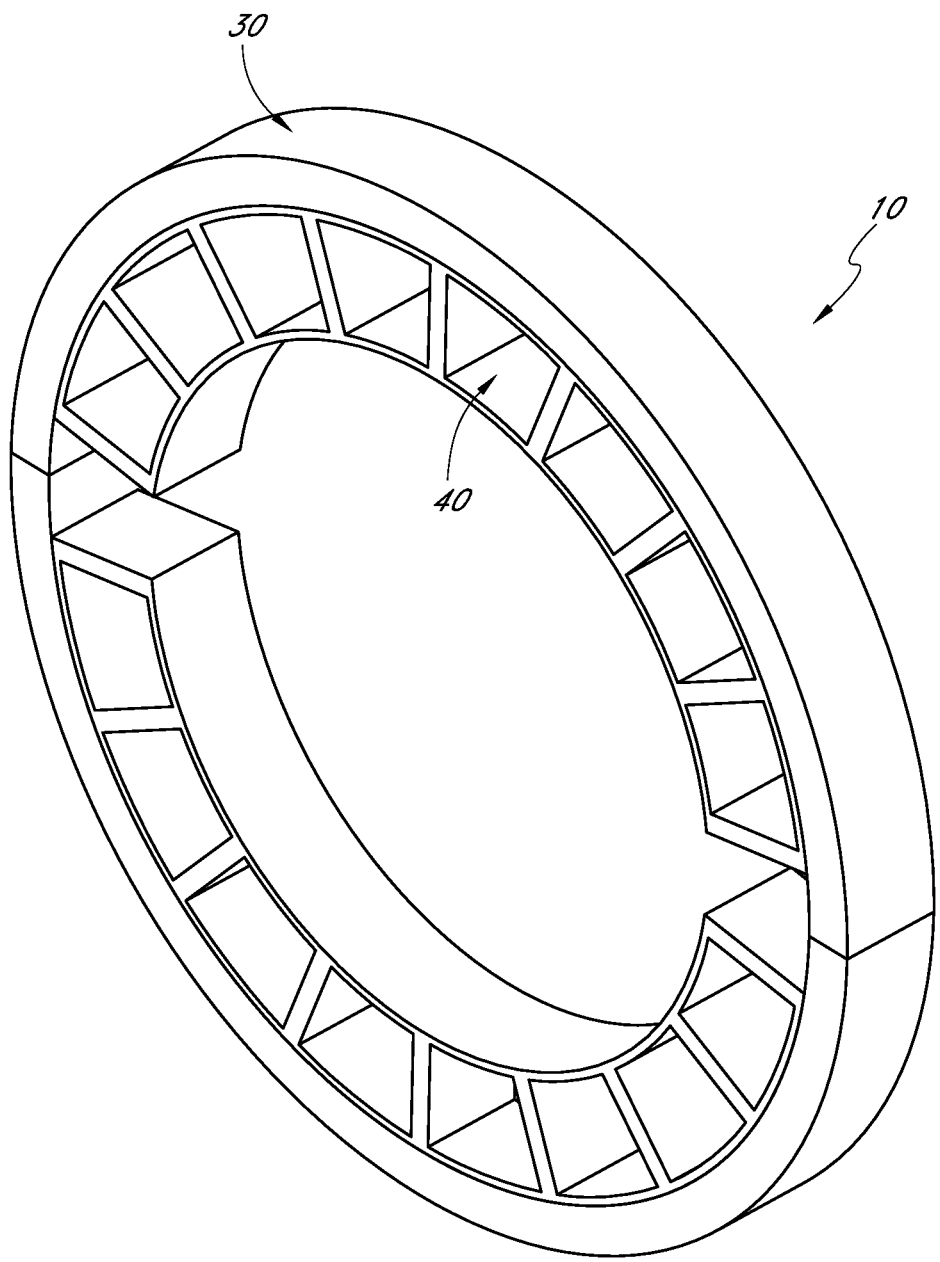
FIG. 6B is a top, front, and left side perspective view of another embodiment of a run-flat device.
Figure 6C:
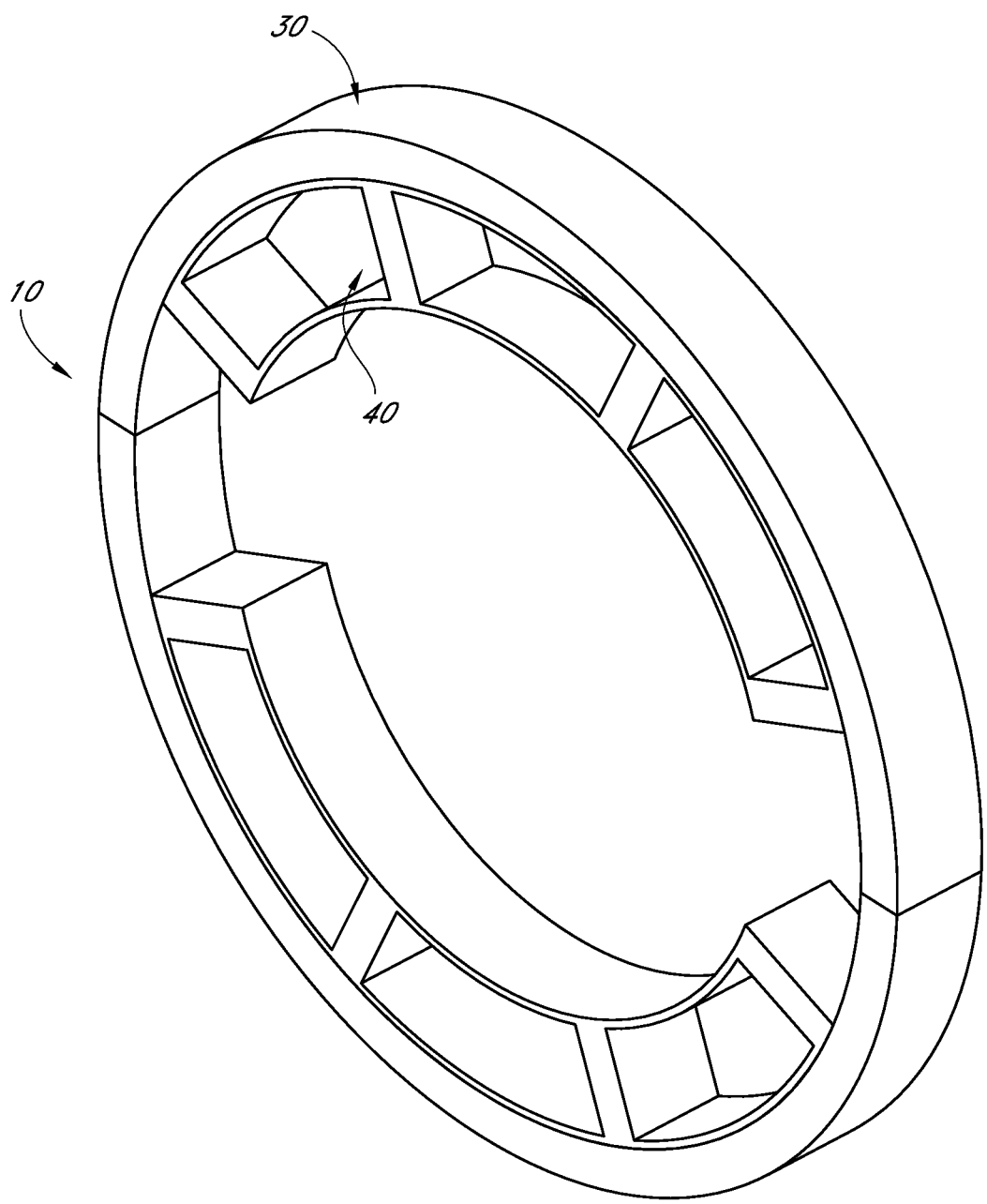
FIG. 6C is a top, front, and left side perspective view of another embodiment of a run-flat device.
Figure 6D:
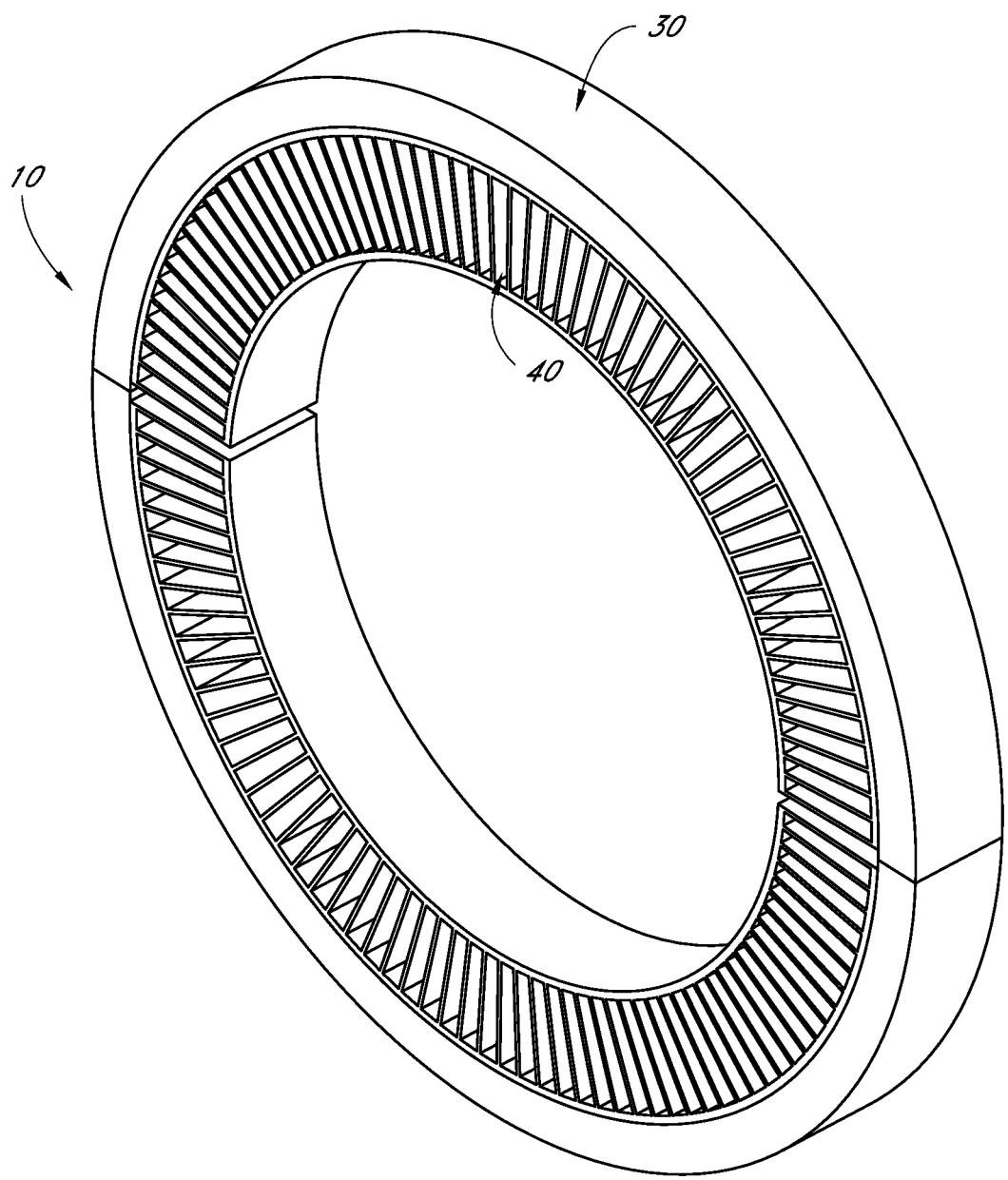
FIG. 6D is a top, front, and left side perspective view of another embodiment of a run-flat device.

With reference to FIGS. 6-6D, in at least one embodiment the interconnected web 40 and generally annular outer ring 30 can be formed from one continuous material. For example, the web 40 and outer ring 30 can be cast or injection molded as a unitary piece 60 from a material such as plastic or urethane. Other materials can also be used. By forming the web 40 and outer ring 30 from one material, the bonding surfaces between the web 40 and outer ring 30 can be reduced or eliminated, which can be advantageous for providing structural strength and rigidity to the run flat device 10. Forming the web 40 and outer ring 30 as one unit can facilitate ease of manufacturability. In an embodiment illustrated in FIG. 6, the unitary piece 60 comprises a first unitary piece 61 and a second unitary piece 62 that are semicircular unitary pieces that can be fastened together at flanges 14 to form a circular unitary piece 60. In other embodiments, the unitary piece can comprise more than two pieces that join together to form a circular unitary piece 60.

With further reference to FIG. 6, the embodiment illustrates a web 40 comprising polygonal openings 50 that are generally hexagonally shaped, similar to the discussion above for FIGS. 4-4H. However, in the embodiment of FIG. 6, the generally hexagonal openings 63 extend from the inner circumference 66 of the web 40 to the outer ring 30. In other words, the inner circumference 66 defines the radially inner side of the generally hexagonal opening 63 and the outer ring 30 defines the radially outer side of the generally hexagonal opening 63. The distance between the inner circumference 66 and the outer ring 30 is spanned by two radial web elements 47 that are joined at an intersection 44. The radial web elements 47 extend at an angle from a radial plane 16, as illustrated in FIG. 6, to form the sides of the generally hexagonal opening 63.

The radial web elements 47 are connected at their intersections 44 by tangential web elements 45, forming two generally trapezoidal openings 64 between the generally hexagonal openings 63, as illustrated in FIG. 6. The tangential web elements 45 define the minor parallel side of the generally trapezoidal openings 64 and the inner circumference 66 and the outer ring 30 define the bases of the generally trapezoidal openings 64. The angled sides of the generally trapezoidal opening are defined by the radial web elements 47.

FIG. 6A illustrates an embodiment of a unitary piece 60 with a plurality of generally rectangular openings 65 defined by a plurality of radial web elements 47 interconnecting an inner circumference of the web 40 with an outer circumference 68 of the web 40. In the embodiment illustrated in FIG. 6A, the radial web elements 47 are generally parallel with the radial plane 16 at each location around the web 40. In other embodiments, the radial web elements 47 can be at an angle to the radial plane 16. FIG. 6A illustrates the first and second unitary pieces 61, 62 each having twenty-three generally rectangular openings 65. However, in other embodiments, as discussed below, the first and second unitary pieces 61, 62 can have more or less generally rectangular openings 65.

FIG. 6B illustrates another embodiment of a unitary piece 60 similar to the embodiment of FIG. 6A, but with eight generally rectangular openings 65 on each of the first and second unitary pieces 61, 62. There are a fewer number of radial web elements 47 in this embodiment, but the thickness of the radial web elements 47 are greater compared to the radial web elements 47 in FIG. 6A, which can enable each radial web element 47 to withstand greater loads. In other embodiments, however, the radial web elements 47 of FIG. 6B can have a thickness similar to the radial web elements of FIG. 6A.

FIG. 6C illustrates yet another embodiment of a unitary piece 60 having only three generally rectangular openings 65 on the first and second unitary pieces 61, 62. The radial web elements 47 in this embodiment are thicker than either of the radial web elements 47 of FIG. 6A or 6B. However, in other embodiments, the thickness of the radial web elements 47 can be the same as the thickness of the radial web elements 47 of FIG. 6A or 6B.

The embodiment of FIG. 6D illustrates yet another embodiment of a unitary piece 60 with fifty-seven generally rectangular openings 65 on each of the first and second unitary pieces 61, 62. The radial web elements 47 in this embodiment are thinner than any of the radial web elements 47 of FIGS. 6A-C. In other embodiments, the thickness of the radial web elements 47 can be the same as the thickness of the radial web elements 47 of FIGS. 6A-C.

In some embodiments, fibers in the web 40 and/or outer ring 30 can add structural rigidity to the injection molded material which forms the integrally formed web 40 and outer ring 30. Also, in some embodiments, the urethane or other injection grade material forming the outer ring 30, can provide more resiliency to applied forces and absorb more of the impact than compared to a rigid metal outer ring.

Figure 7:
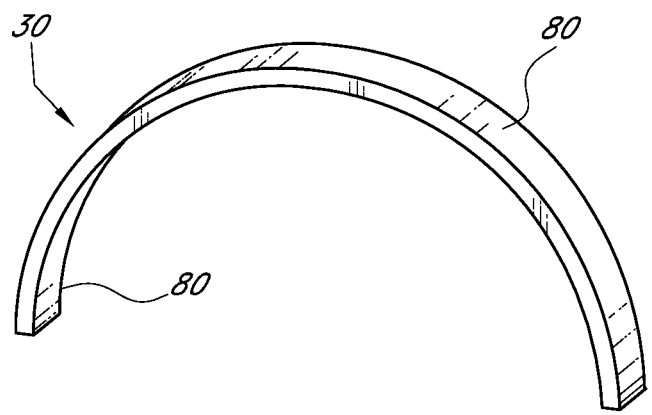
FIG. 7 is a partial top, front, and left side perspective view of another embodiment of a run-flat device.

With reference to FIG. 7, in some embodiments the outer ring 30 can comprise a middle portion 79 made, for example, of a urethane or plastic material, interposed between an outer element 80 secured to the radial outside surface of the middle portion 79 and an inner element 81 secured to the radial inside surface of the middle portion 79. In some embodiments, the outer and/or inner elements 80, 81 can be spring steel elements. The spring steel elements 80 can provide added stiffness to the outer ring 30, as well as preserve some flexibility to the run-flat 10, such that the run-flat 10 and outer ring 30 can rebound more quickly from an impact hit as compared to a run-flat 10 with only a urethane outer ring. In other embodiments, the outer and/or inner elements 80, 81 can be any other material known in the art that can provide stiffness while preserving some flexibility.

Figure 8:
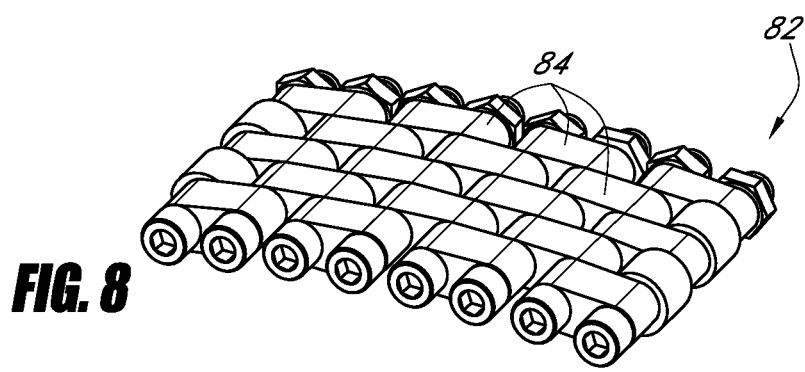
FIG. 8 is a perspective view of flexible links which can be used in an embodiment of a run-flat device.
Figure 9:
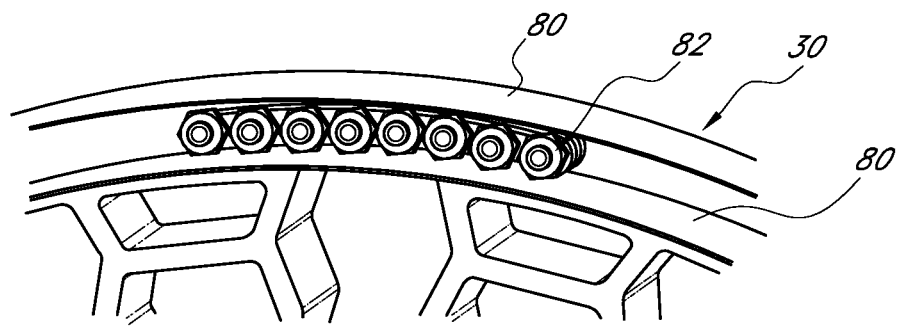
FIG. 9 is a sectional view of the flexible links of FIG. 8 in use.

With reference to FIGS. 8 and 9, in some embodiments the run-flat 10 can include a flexible link element 82. The flexible link element 82 can comprise a plurality of links 84 which are coupled (e.g. hinged) to one another to provide the link element 82 with flexibility in at least one degree of freedom. Each link 84 can comprise two through holes wherein elongate screws 83 can pass to couple two or more links 84 together. In the embodiment illustrated in FIGS. 8 and 9, the screws 83 couple five links 84 together. The links 84 are held secured to the screw 83 by a nut 85 that attaches to the end of the screw 83. In some embodiments, the links 84 can be made of a metal. In other embodiments, the links 84 can be made of other materials, such as plastics or composites.

As illustrated in FIG. 9, the link element 82 can be embedded in the outer ring 30. In some embodiments, the link element 82 can be embedded in the middle portion 79 of the outer ring 30. The link element 82 can be extend partially or entirely around the run-flat 10, and can provide added stiffness and/or flexibility to the run-flat 10 and outer ring 30. In some embodiments, the link element 82 can extend partially or entirely around the run-flat 10 and join and/or hold pieces 32 and 34 of the outer ring 30 together. With the pieces 32 and 34 of the outer ring 30 held together, the link element 82 can provide a flexible joint section that can withstand impacts to the tire.

The outer ring 30, as described above and illustrated in FIG. 1, can comprise pieces 32, 34 which are held together by fasteners (e.g. bolts) to form the outer ring 30. The pieces 32, 34 can comprise bolt flanges 14 for accepting the fasteners. As illustrated in FIGS. 10A and 10B, in some embodiments the bolt flanges 14 can comprise a tab 86 and/or pocket 88. In some embodiments, the tabs 86 and pockets 88 can have an interference fit, which can enable the tabs 86 and pockets 88 to transmit radial forces. In other words, the tabs 86 and pockets 88 can carry at least a portion of any shear stress experienced by the outer ring 30 during use of the run-flat 10. In some embodiments, the tabs 86 and pockets 88 can comprise generally rectangular shapes, such as those shown in FIGS. 10A and 10B. Other embodiments can comprise different quantities, sizes, and/or shapes of the tabs 86 and pockets 88.

Figure 11:
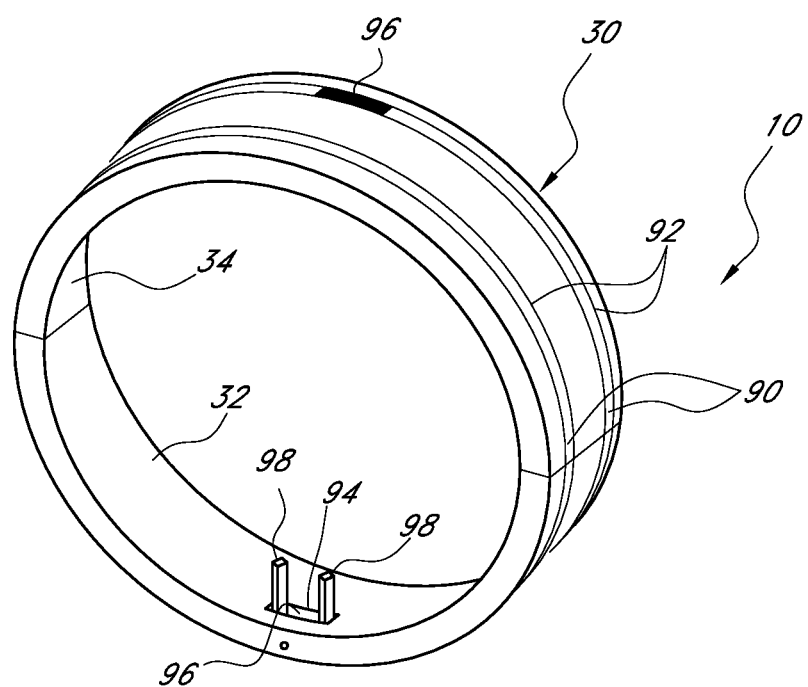
FIG. 11 is a top, front, and left side perspective view of another embodiment of a run-flat device.

With reference to FIG. 11, in some embodiments the outer ring 30 can comprise at least one cable 90, which is preferably made of steel. The steel cable 90 can be used to hold the pieces 32, 34 together in the embodiment illustrated in FIG. 11, two steel cables 90 are wrapped around the pieces 32, 34. The cables can rest on an exterior portion of the outer ring 30, or can be nested within preformed grooves or channels 92 that extend along the outer circumference of the outer ring 30. The pieces 32, 34 can have openings 94 through which the cables 90 can be pulled. The cables 90 can be held together (e.g. tightened) by a tightening device 96, such as for example a wedge-like structure which can frictionally engage and hold ends 98 of the cables 90 together.

Figure 12:
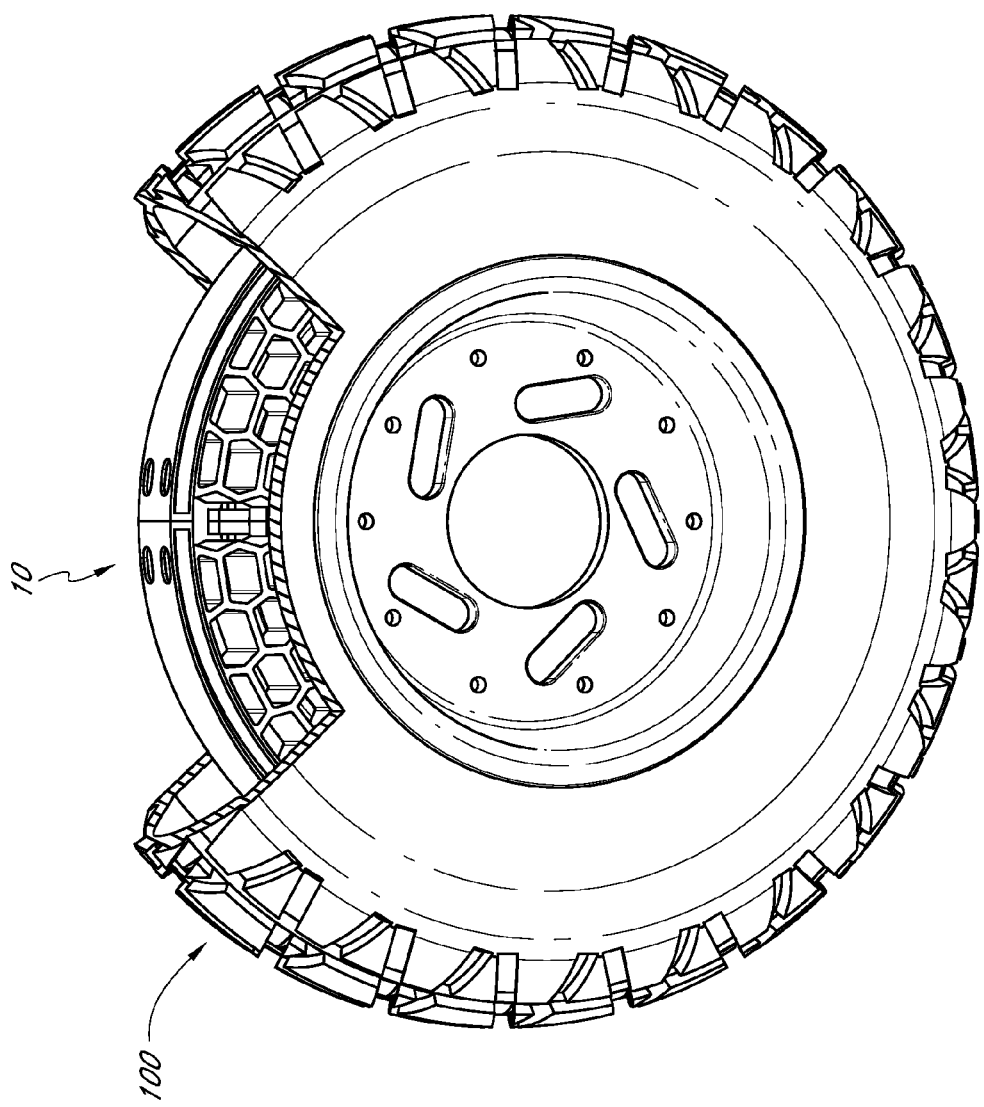
FIG. 12 is a perspective view of an embodiment of a run-flat insert attached within a pneumatic tire, the pneumatic tire having a cutout portion on top to reveal the run-flat insert.

With reference to FIG. 12, the run-flat 10 can be inserted into a conventional pneumatic tire 100 such that the run-flat 10 holds the beads of the tire 80 in place and remains hidden underneath the tire 100 during use of the tire 100. If the tire 100 suffers a puncture, damage, or in any way fails and deflates, the run-flat 10, and its outer ring 30 and web structure 40, can allow the tire 100 to remain running for an extended period of time.

If the tire 100 does not have a sidewall and becomes deflated, the generally annular outer ring 30, combined with the interconnected web 40, can also add lateral stiffness to the assembly.

A major advantage of the run-flat device 10 is the removal of mass by using an interconnected web 40 to transmit loads applied by a vehicle. This decreased weight can improve fuel economy and the air transportability of the vehicle, both being key properties to the military. In addition, by transmitting vibration and shock to the web 40, the ride can be less harsh.

The run-flat device 10 can exhibit many of the same characteristics of the current run-flat devices. For example, it can demonstrate similar ability to carry loads; can have the ability to function when surrounding pneumatic tires fail; can have costs for given performances that are similar to traditional run-flat devices. However, the run-flat device of the present application can have a better ride than current run-flat devices; can be easier to assemble than single piece run-flat devices; can have lower weight than solid run-flat devices; and can transfer less road vibration and shock than current run-flat devices.

Figure 13:
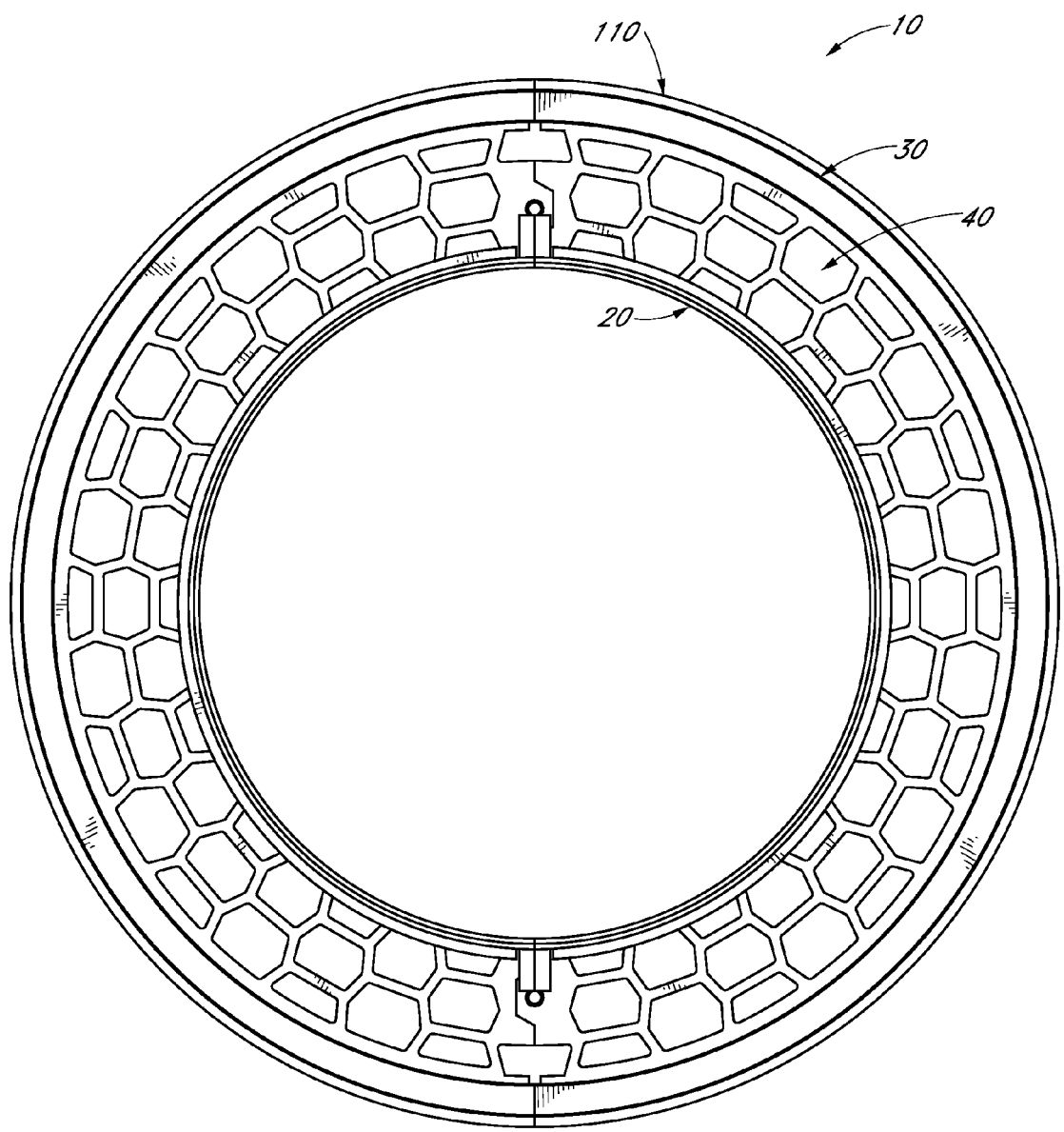
FIG. 13 is a front side elevational view of an embodiment of a run-flat device.
Figure 14:
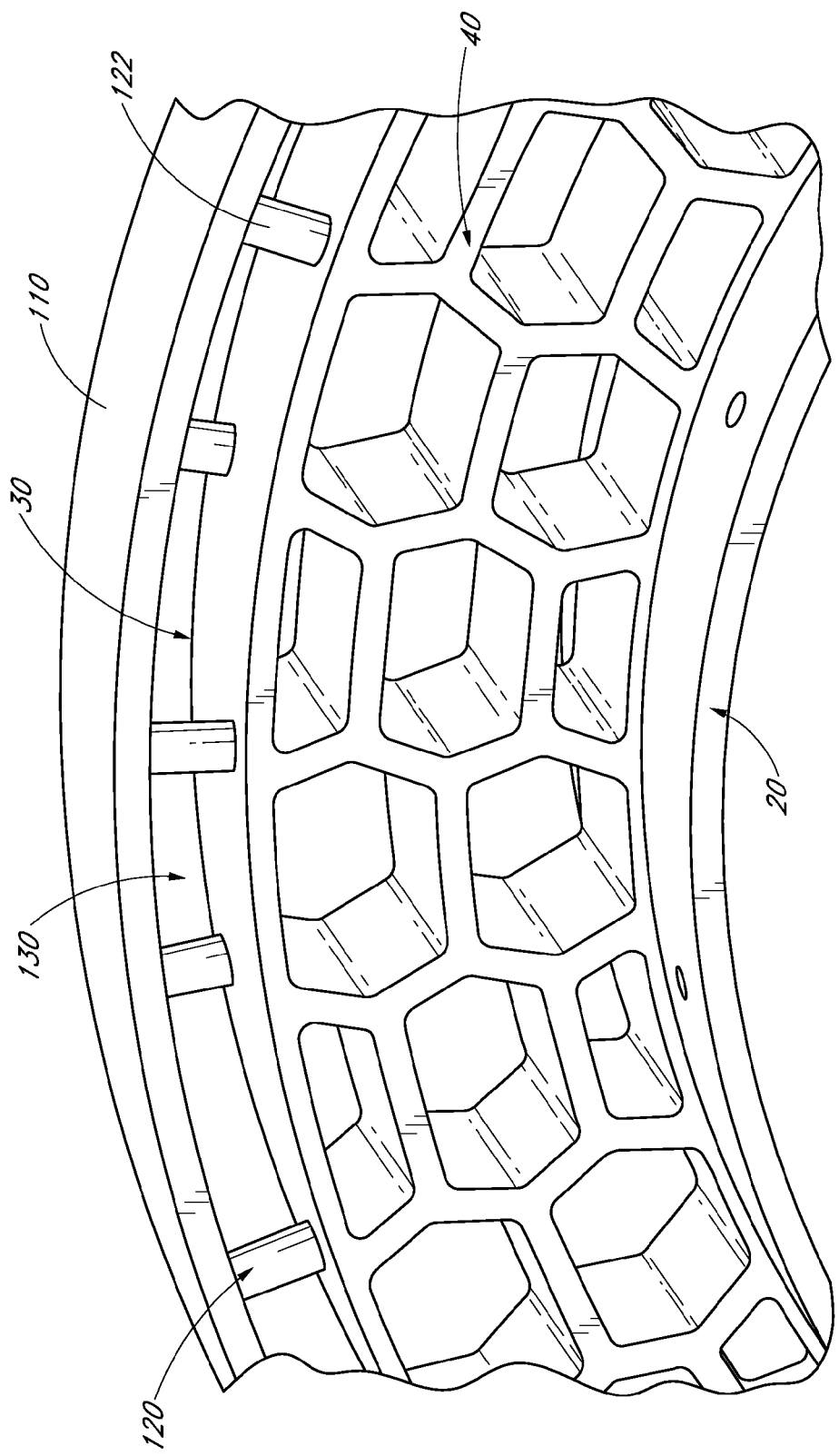
FIG. 14 is a front view of another embodiment of a run-flat device.
Figure 15:
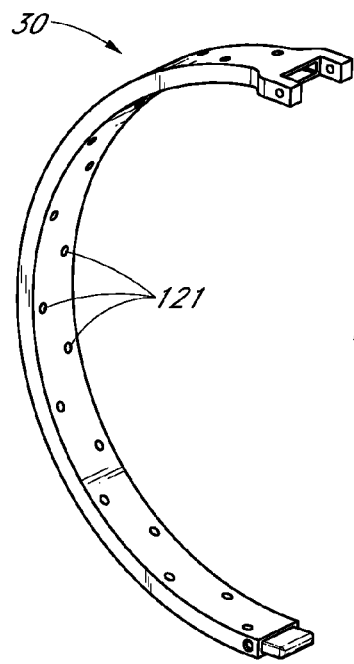
FIG. 15 is a top, front, and left side perspective view of another embodiment of a run-flat device.

As illustrated in FIGS. 13-15, in another embodiment a run-flat device 10, which is similar to the embodiment of FIG. 1, but also comprises at least one mechanical lock assembly 120 that couples the outer ring 30 to the interconnected web 40. The mechanical lock assembly can be formed by providing the outer ring 30 with a plurality of holes 121 (see FIG. 15) that can be pre-drilled or otherwise formed in the outer ring 30. As will be described below, mechanical lock members 122 can extend through the holes 121 and can connect to an outer layer 110. The separate outer layer 110 may be made of urethane, plastic, or any other suitable material. In one embodiment, the separate outer layer 110, the mechanical lock members 122 and the web 40 are formed from the same material.

In one embodiment, the outer ring 30 is placed in a mold (not shown) used to form the web 40 and the outer layer 110. The material used to form the web 40 can then flow through the holes 121 to form the web 40, the mechanical lock members 122, the outer layer 110. In this manner, the outer ring 30 becomes locked to the web 40. In modified embodiments, the mechanical lock assembly 120 can be formed without the outer layer 110 and/or the holes 121 can have different shapes and/or comprise channels positioned along the edge of the outer ring 30. In one arrangement, a single hole or channel can be formed in the outer ring 30 and/or inner ring 20.

This assembly of FIGS. 13-15 can improve adhesion between differing materials (e.g., the outer ring 30 and the interconnected 40) with poor probably of adhesion by providing a mechanical lock between the interconnected web 40 and the outer ring 30. In another embodiment, the inner ring 20 can be connected to the web 40 in a manner similar to that described above (e.g., by providing the inner ring 20 with holes or channels). In either embodiment, adhesives may also be used in combination with the mechanical lock assembly 120 to aid the connection between the inner ring 20, outer ring 30 and/or web 40.

In some embodiments, the outer layer 110, which can be formed of urethane or an injection grade material, can provide more resiliency to applied forces and absorb more of the impact compared to a rigid metal outer ring 30. In some embodiments, the outer ring can be made of a plastic, urethane or similar type material that is reinforced with, for example, a filling material (e.g., glass or carbon fiber).

In the embodiments of FIG. 13-15, the separate injection molded outer layer 110 can provide additional strength and structural rigidity in addition to the outer ring 30. In such embodiments, the outer layer 110 can be reinforced with selected materials. For example, in one arrangement, the outer layer 110 can be filled with glass. In other embodiments, the outer layer may 110 be filled with carbon fiber.

Figure 16:
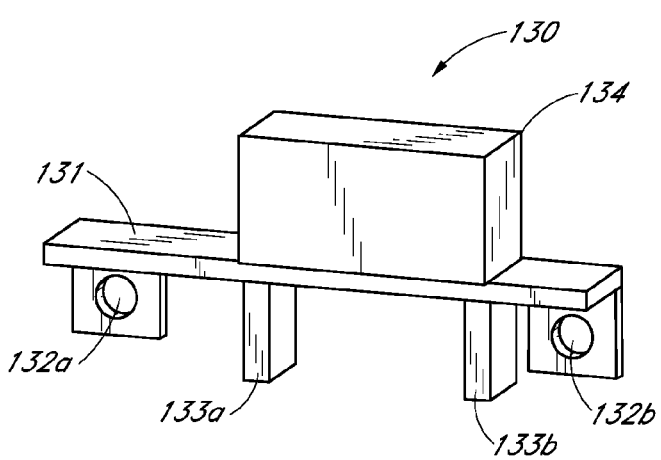
FIG. 16 is a top, front, and left side perspective view of an embodiment of a hard stop device.
Figure 16A:
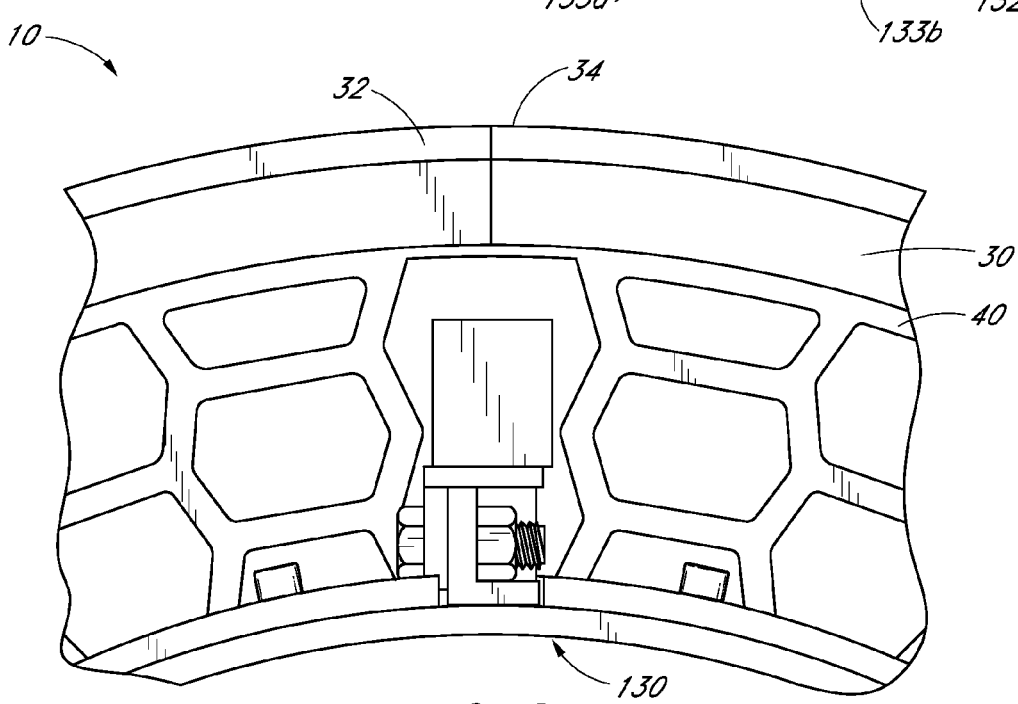
FIG. 16A is a partial front view of a hard stop in an embodiment of a run-flat device.

As illustrated in FIGS. 16 and 16A, according to another embodiment a removable hard stop assembly 130 can be added to a joint area between the two semi-circular pieces of the outer ring 32, 34 in an area between the inner and outer rings 20, 30. As will be described below, the stop assembly 130 can comprise a resilient member 134, which can form a "stop" under the joint area between the two pieces of the outer ring 32, 34. In this manner, during extreme loads (e.g., impact loads) the stop assembly 130 can limit severe inward buckling of the resilient tire 10 in the joint area.

In the illustrated embodiment, the hard stop assembly 130 can comprise a bracket 131, which supports the stop member 134 within the run-flat 10. In the illustrated arrangement, the bracket 131 includes a pair of screw holes 132a, 132b and two bars 133a, 133b extending downwards from a main body of the bracket 131. The two bars 133a, 133b can be spaced apart slightly farther than the width of the web 40. The screw holes 132a, 132b, can be used to couple the bracket 131 to flanges provided on the inner ring 20 (see e.g., FIGS. 1-3). The stop member 134 can be adhered or otherwise coupled to the top of the bracket 131. In some embodiments, the stop member 134 can have a rectangular prism shape but other embodiments can utilize different shapes. In addition, other methods and arrangements can be used for positioning the stop member 134 within the joint area. For example, a bracket 131 of a different configuration can be used or the stop member 134 can be attached directly to a component of the run-flat 10.

The stop member 134 can be made of rubber or any other suitable resilient material that may further assist the interconnected web in distributing the stresses and strains of the tire assembly 10 when subject to an impact load L'. An impact load L' may comprise, for example, the sudden impact from the tire contacting a pot hole or a piece of debris in the road.

In other embodiments, the stop member 134 can be made from a relatively rigid material.

Figure 17:
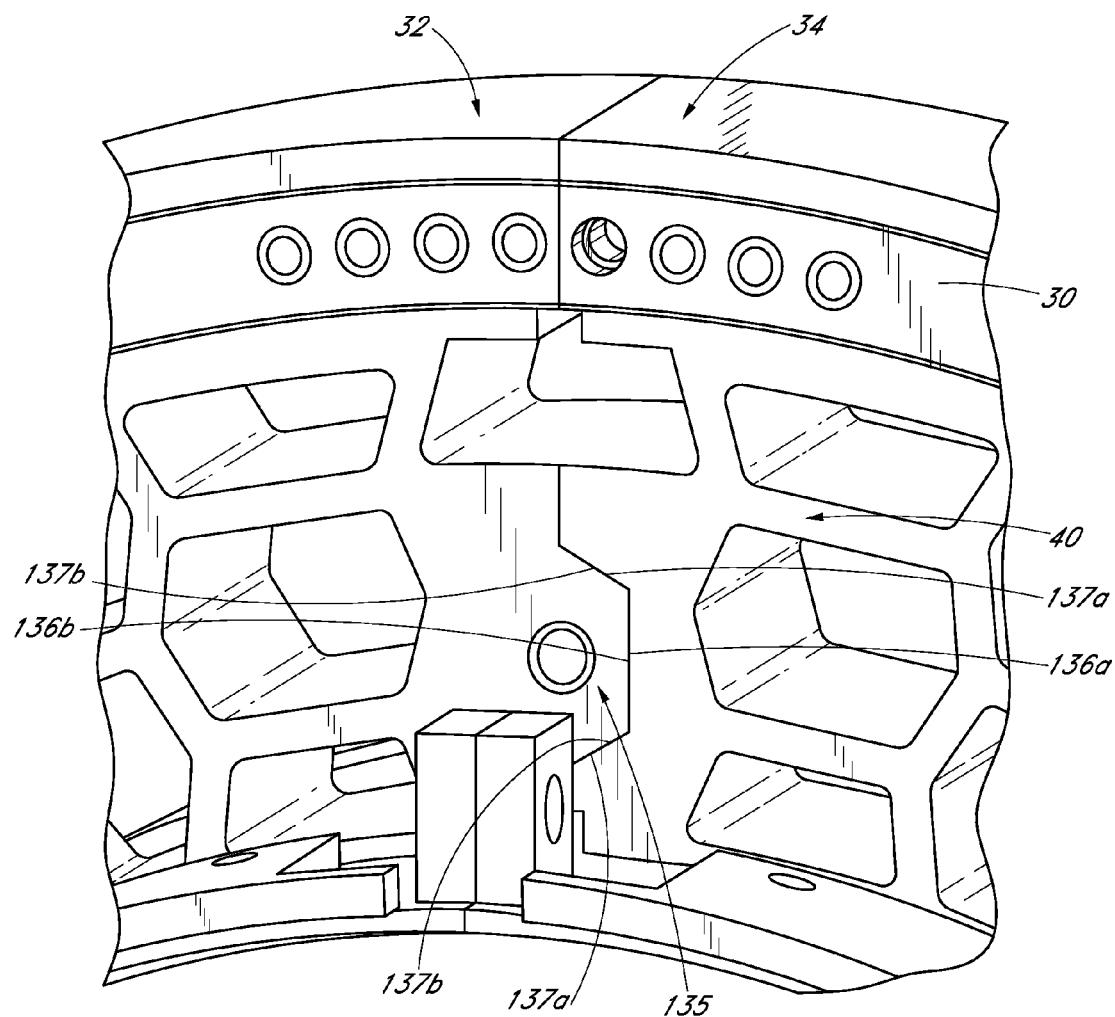
FIG. 17 is a partial front side view of a hard stop in an embodiment of a run-flat device.

With reference to FIG. 17, another embodiment of a stop assembly 135 is shown. In this embodiment, a stop assembly is formed by molding into the interconnected web 40 in abutting joint surfaces 136a,b. In the illustrated embodiment, the abutting joint surfaces 136a, form a trapezoidal shape comprising at least one pair of joint surface 137a, 137b that extend traverse to a radial direction of the run-flat 10. The molded hard stop assembly 135 can stiffen the run-flat 10 in the joint area between the two pieces of the outer ring 30, which can protect the run-flat 10 during impact loads as described above. The molded hard stop assembly 135 also may limit deflection of the outer ring in the joint area, and provide a larger area for connection of the two halves of the interconnected web and outer ring pieces 32, 34.

Figure 18:
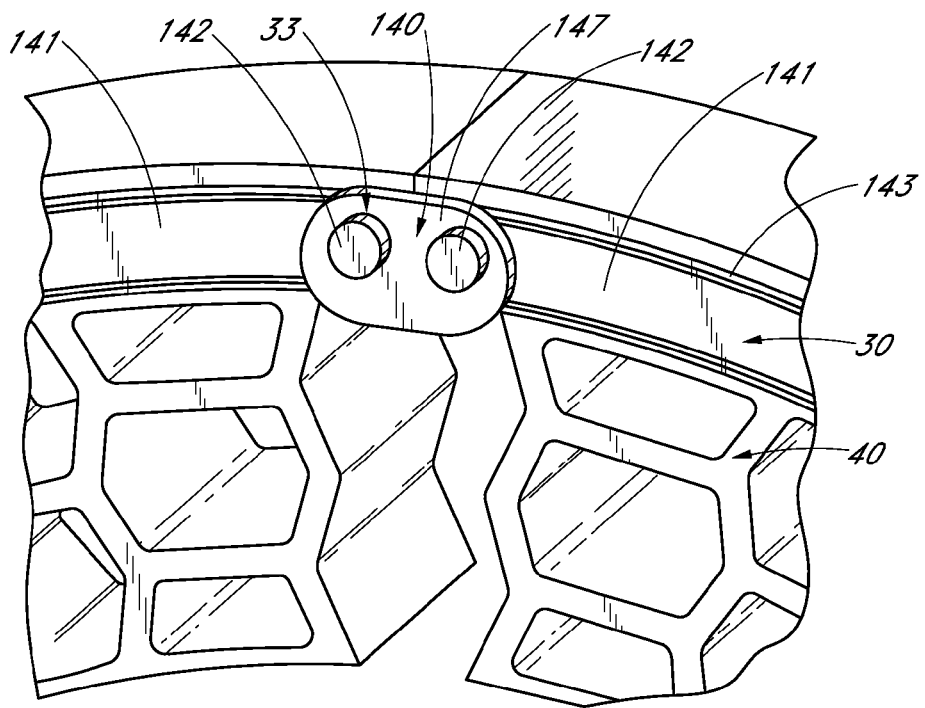
FIG. 18 is a partial top, front, and left side view of an embodiment of a run-flat device.
Figure 18A:
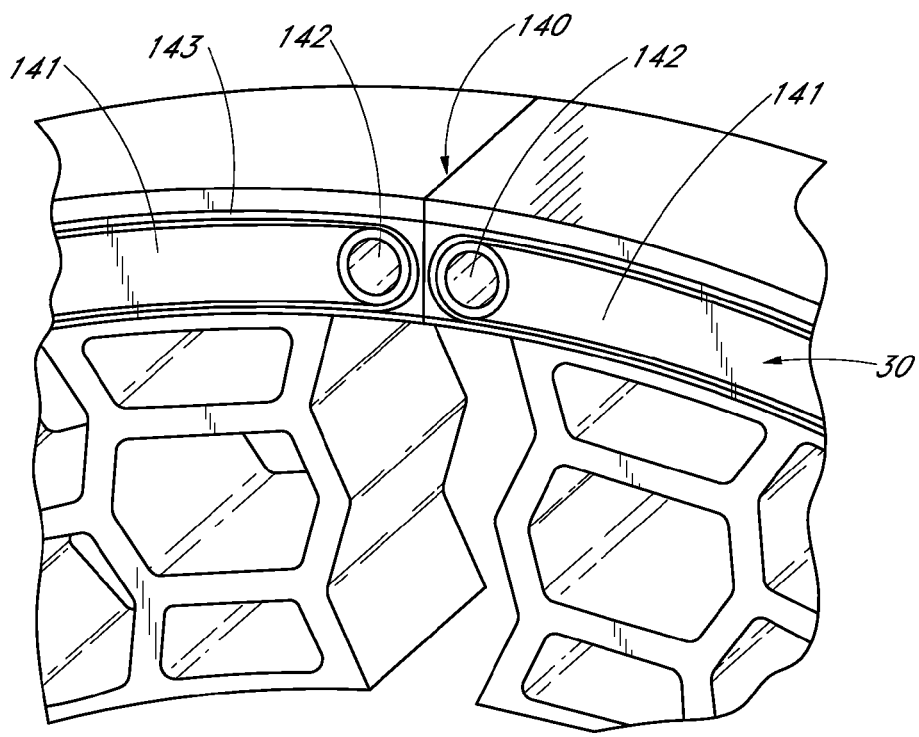
FIG. 18A is a partial top, front, and left side view of an embodiment of a run-flat device.

According to several embodiments described herein, the outer ring 30 may comprise pieces 32, 34 which are held together by, for example, fasteners (e.g. bolts) to form the outer ring 30. FIG. 18 illustrates an outer ring 30 comprising pieces 32, 34, which can each comprise a steel belt 143 positioned about a rubber outer ring 141. To connect the pieces of the outer ring 30, a joint assembly 140 as shown in FIG. 18 can be used. In this embodiment, each piece 32, 34 is provided with bushings 142, which each extend laterally from one or both sides of the piece 32, 34. The bushings 142 can be secured to each other by providing a flange 147 that includes a pair of openings such that the flange 147 can extend around both bushings 142. The flange 147 and bushing 142 can be formed from a metal (e.g. steel) and/or a resilient material such as, for example, rubber, plastic, etc.

Figure 19:
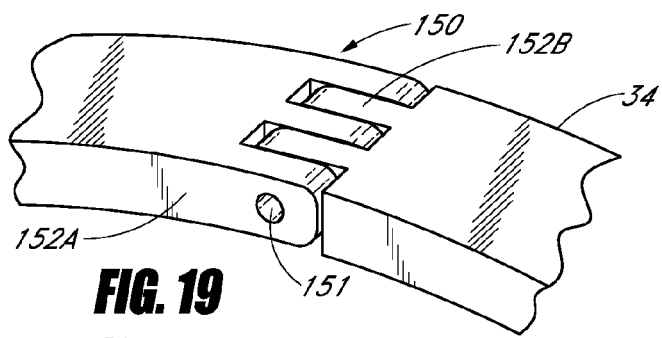
FIG. 19 is a partial view of a joint system.
Figure 19A:
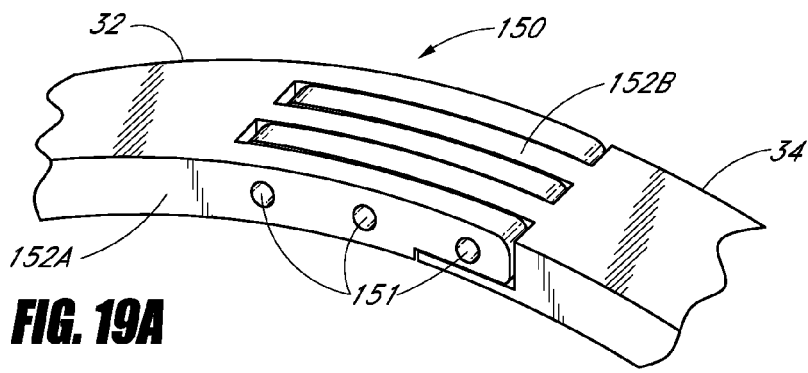
FIG. 19A is a partial view of another embodiment of a joint system.

According to an another embodiment that is illustrated in FIGS. 19-19A, another embodiment for connecting the outer ring pieces 32, 34 can be provided. In this embodiment, the connection is provided by an interlocking finger-type joint assembly 150. In this embodiment, each joint is comprised of at least one pin 151 inserted between the extended fingers 152a, 152b of each half of the outer ring 32, 34. According to some embodiments, the ends of each half of the outer ring form interlocking fingers.

By varying the number of pins connecting the halves of the outer ring and in some embodiments the length of the fingers, the rigidity of the joint may be adjusted. As illustrated in FIG. 19, the interlocking finger-type joint assembly 150 may be comprised of a single pin 151. As illustrated in FIG. 19A, in some embodiments multiple pins 151 may also provide for a more rigid joint along longer fingers.

Figure 20:
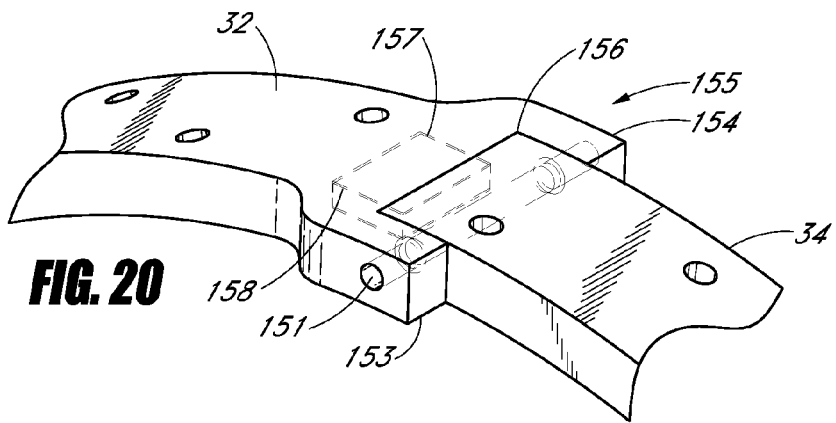
FIG. 20 is a partial view of an embodiment of a joint system.

According to other embodiments, as illustrated in FIG. 20, at least two of the outer ring pieces 32, 34 may also be connected by a wedge-in-pocket outer ring joint assembly 155 with a pin 151 extending through the ring width. The pocket 156 may comprise bolt flanges 153, 154 to form the sides of the pocket 156 and allow a pin 151 to extend through the assembly width-wise. Wedge 157 is disposed on the end of outer ring piece 34. Aperture 158 is within outer ring piece 32 and opens into pocket 156. Aperture 158 is shaped to fit wedge 157. It should be appreciated that in modified embodiments the aperture 158 and wedge 157 can have different shapes and sizes.

Figure 20A:
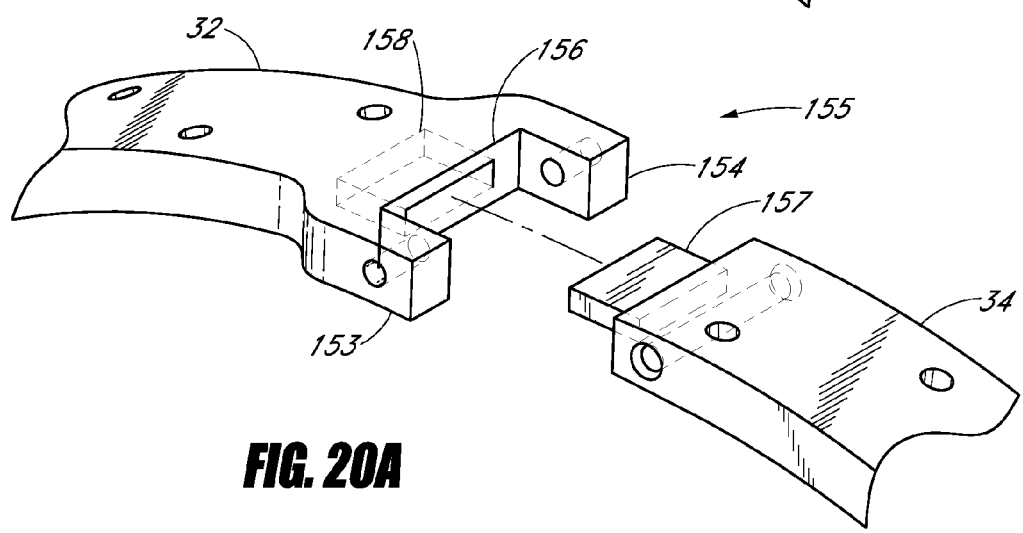
FIG. 20A is an exploded view of an embodiment of a joint system.

As illustrated in FIGS. 20 and 20A, in the wedge-in-pocket outer ring joint assembly 155, the outer ring piece 34 may fit snugly into wedge pocket 156 to form a tight interference fit. Additionally, wedge 157 fits snugly into aperture 158. The pin 151 then extends through bolt flanges 153, 154 of piece 32 to secure the connection. These additional connection points increase the amount of load the outer ring can sustain without failure.

The embodiments described above may be used in a number of tire applications including a non-pneumatic type tire as well as a tire that works in compression. In a compression-type tire, the web 40 can be replaced with a compression element (e.g, a solid piece of material) and/or modified to operate in a compression mode. Such embodiments can then be combined with the various embodiments described herein. That is, in some embodiments, a support element comprising either a web element 40 acting in substantially in tension or a compression element can be positioned between the inner and outer ring of the run-flat 10.

While the foregoing written description of embodiments of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiment and method, but by all embodiments and methods within the scope and spirit of the invention as claimed.

What is claimed is:

1. A run-flat device for use with a pneumatic tire comprising:
   an inner ring having an axis of rotation, the inner ring comprising at least two annular pieces;
   a first coupler for coupling together the at least two annular pieces of the inner ring;
   a deformable outer ring having an inner surface generally facing the inner ring and an outer surface generally facing away from the inner ring, the outer ring comprising at least two annular pieces;
   a second coupler for coupling together the at least two annular pieces of the outer ring;
   a support element comprised of a polymeric material, the support element being coupled to an outer surface of the inner ring and coupled to the inner surface of the outer ring; and
   a stop element positioned between the at least two annular pieces of at least the inner ring and spaced apart from the inner surface of the outer ring by a distance, the stop element being configured to limit radial deflection of the inner and outer surfaces of the outer ring towards the inner ring through the distance.

2. A run-flat device according to claim 1, wherein the stop element comprises a resilient piece of material positioned between the inner and outer ring.

3. A run-flat device according to claim 2, wherein the stop element comprises a metal bracket that supports the resilient piece of material between the inner and outer ring.

4. A run-flat device according to claim 3, wherein the stop element is removable from the run-flat device.

5. A run-flat device according to claim 1, the support element comprises a flexible tension element extending between the inner and outer ring and comprising at least two annular pieces, wherein a substantial amount of load is supported by the tension element working in at least in part tension when the run-flat device is in direct contact with the ground.

6. A run-flat device according to claim 5, the stop element is formed by a portion of the tension element that forms a pair of abutting joint surfaces that extend traverse to a direction radial to the axis of rotation of the tire.

7. A run-flat device for use with a pneumatic tire comprising:
   an inner ring having an axis of rotation, the inner ring comprising at least two annular pieces;
   a first coupler for coupling together the at least two annular pieces of the inner ring;
   a deformable outer ring comprising at least two annular pieces;
   a second coupler for coupling together the at least two annular pieces of the outer ring;
   a support element positioned between the inner and outer rings; and
   a stop element positioned between the at least two annular pieces of at least the inner ring to limit deflection of the outer ring towards the inner ring, the stop element comprising a resilient piece of material positioned between the inner and outer rings and a metal bracket for supporting the resilient piece of material between the inner and outer rings.

8. A run-flat device for use with a pneumatic tire comprising:
   an inner ring having an axis of rotation, the inner ring comprising at least two annular pieces;
   a first coupler for coupling together the at least two annular pieces of the inner ring;
   a deformable outer ring comprising at least two annular pieces;
   a second coupler for coupling together the at least two annular pieces of the outer ring;
   a support element positioned between the inner and outer rings and comprising a flexible tension element extending between the inner and outer rings, the tension element comprising at least two annular pieces, wherein a substantial amount of load is supported by the tension element working at least partially in tension when the run-flat device is in contact with a ground surface; and
   a stop element positioned between the at least two annular pieces of at least the inner ring to limit deflection of the outer ring towards the inner ring, and the stop element being formed by a portion of the tension element which forms a pair of abutting joint surfaces extending transversely to a direction radial to the axis of rotation.

9. The run-flat device of claim 8, wherein the stop element is separated from the outer ring by a void, and the stop element is configured to limit radial deflection of the outer ring when the outer ring moves radially through the void.

* * * * *